United States Patent
Ito et al.

(10) Patent No.: US 7,324,980 B2
(45) Date of Patent: Jan. 29, 2008

(54) INFORMATION PROCESSING APPARATUS AND METHOD

(75) Inventors: Masato Ito, Tokyo (JP); Jun Tani, Kanagawa (JP)

(73) Assignees: Sony Corporation, Tokyo (JP); Riken, Saitama (JP)

( * ) Notice: Subject to any disclaimer, the term of this patent is extended or adjusted under 35 U.S.C. 154(b) by 422 days.

(21) Appl. No.: 10/483,093

(22) PCT Filed: Jan. 21, 2003

(86) PCT No.: PCT/JP03/00486

§ 371 (c)(1),
(2), (4) Date: Jan. 7, 2004

(87) PCT Pub. No.: WO03/096270

PCT Pub. Date: Nov. 20, 2003

(65) Prior Publication Data

US 2005/0065900 A1  Mar. 24, 2005

(30) Foreign Application Priority Data

May 10, 2002  (JP) ............................. 2002-135238

(51) Int. Cl.
*G06F 19/00* (2006.01)
(52) U.S. Cl. ........................ 706/30; 706/12; 706/14; 706/15; 706/16
(58) Field of Classification Search .................. 706/5, 706/6, 10, 12, 14–16, 22, 23, 26, 30
See application file for complete search history.

(56) References Cited

U.S. PATENT DOCUMENTS 5,408,424 A * 4/1995 Lo .............................. 708/303

5,956,702 A * 9/1999 Matsuoka et al. ............. 706/22

(Continued)

FOREIGN PATENT DOCUMENTS

JP  2002-86378  3/2002

OTHER PUBLICATIONS

Takase, H. et al., "Time Sequential Pattern Transformation and Attractors of Recurrent Neural Networks", In: Proc. of 1993 International Joint Conference on Neural Networks, 1993, pp. 2319-2321.

*Primary Examiner*—David Vincent
*Assistant Examiner*—Omar F Fernández Rivas
(74) *Attorney, Agent, or Firm*—Frommer Lawrence & Haug LLP; William S. Frommer; Thomas F. Presson

(57) ABSTRACT

This invention relates to an information processing device and method that enable generation of an unlearned new pattern. Data $x_t$ corresponding to a predetermined time series pattern is inputted to an input layer (11) of a recurrent neural network (1), and a prediction value $x^*_{t+1}$ is acquired from an output layer 13. A difference between teacher data $x_{t+1}$ and the prediction value $x^*_{t+1}$ is learned by a back propagation method, and a weighting coefficient of an intermediate layer 12 is set at a predetermined value. After the recurrent neural network is caused to learn plural time series patterns, a parameter having a different value from the value in learning is inputted to parametric bias nodes (11-2), and an unlearned time series pattern corresponding to the parameter is generated from the output layer (13). This invention can be applied to a robot.

7 Claims, 35 Drawing Sheets

U.S. PATENT DOCUMENTS 6,249,781 B1* 6/2001 Sutton ................... 706/25
6,728,691 B1* 4/2004 Neuneier et al. ............ 706/30
6,735,580 B1* 5/2004 Li et al. ................... 706/21

* cited by examiner

US 7,324,980 B2

INFORMATION PROCESSING APPARATUS AND METHOD

TECHNICAL FIELD

This invention relates to an information processing device and method, and particularly to an information processing device and method that enables output of an unlearned new pattern.

This application claims priority of Japanese Patent Application No.2002-135238, filed on May 10, 2002, the entirety of which is incorporated by reference herein.

BACKGROUND ART

Recently, various studies on human and animal brains have been made. It is known that a neural network can be used as a brain model.

In a neural network, as a predetermined pattern is learned, the learned pattern can be identified. However, there is a problem that the neural network cannot generate a new pattern.

DISCLOSURE OF THE INVENTION

In view of the foregoing status of the art, it is an object of the present invention to enable generation of an unlearned new pattern.

An information processing device according to the present invention includes: input means for inputting a time series pattern; model decision means for deciding a model based on a common nonlinear dynamic system having one or more feature parameters that can be operated from outside with respect to each of plural time series patterns inputted by the input means; arithmetic means for calculating a value of the feature parameter on the basis of the decided model; and output means for setting a value that is different from the value calculated by the arithmetic means, as the feature parameter, and performing inverse operation of the calculation of the value of the feature parameter, thereby outputting a new time series pattern.

The nonlinear dynamic system can be a recurrent neural network with an operating parameter.

The feature parameter can indicate a dynamic structure of the time series pattern in the nonlinear dynamic system.

The output means can output a new time series pattern having a dynamic structure that is shareable with plural inputted time series patterns.

An information processing method according to the present invention includes: an input step of inputting a time series pattern; a model decision step of deciding a model based on a common nonlinear dynamic system having one or more feature parameters that can be operated from outside with respect to each of plural time series patterns inputted by the processing of the input step; an arithmetic step of calculating a value of the feature parameter on the basis of the decided model; and an output step of setting a value that is different from the value calculated by the processing of the arithmetic step, as the feature parameter, and performing inverse operation of the calculation of the value of the feature parameter, thereby outputting a new time series pattern.

A program of a program storage medium according to the present invention includes: an input step of inputting a time series pattern; a model decision step of deciding a model based on a common nonlinear dynamic system having one or more feature parameters that can be operated from outside with respect to each of plural time series patterns inputted by the processing of the input step; an arithmetic step of calculating a value of the feature parameter on the basis of the decided model; and an output step of setting a value that is different from the value calculated by the processing of the arithmetic step, as the feature parameter, and performing inverse operation of the calculation of the value of the feature parameter, thereby outputting a new time series pattern.

A program according to the present invention includes: an input step of inputting a time series pattern; a model decision step of deciding a model based on a common nonlinear dynamic system having one or more feature parameters that can be operated from outside with respect to each of plural time series patterns inputted by the processing of the input step; an arithmetic step of calculating a value of the feature parameter on the basis of the decided model; and an output step of setting a value that is different from the value calculated by the processing of the arithmetic step, as the feature parameter, and performing inverse operation of the calculation of the value of the feature parameter, thereby outputting a new time series pattern.

In the information processing device and method, the program storage medium and the program according to the present invention, a new time series pattern corresponding to an inputted time series pattern is outputted.

BEST MODE FOR CARRYING OUT THE INVENTION

Figure 1:
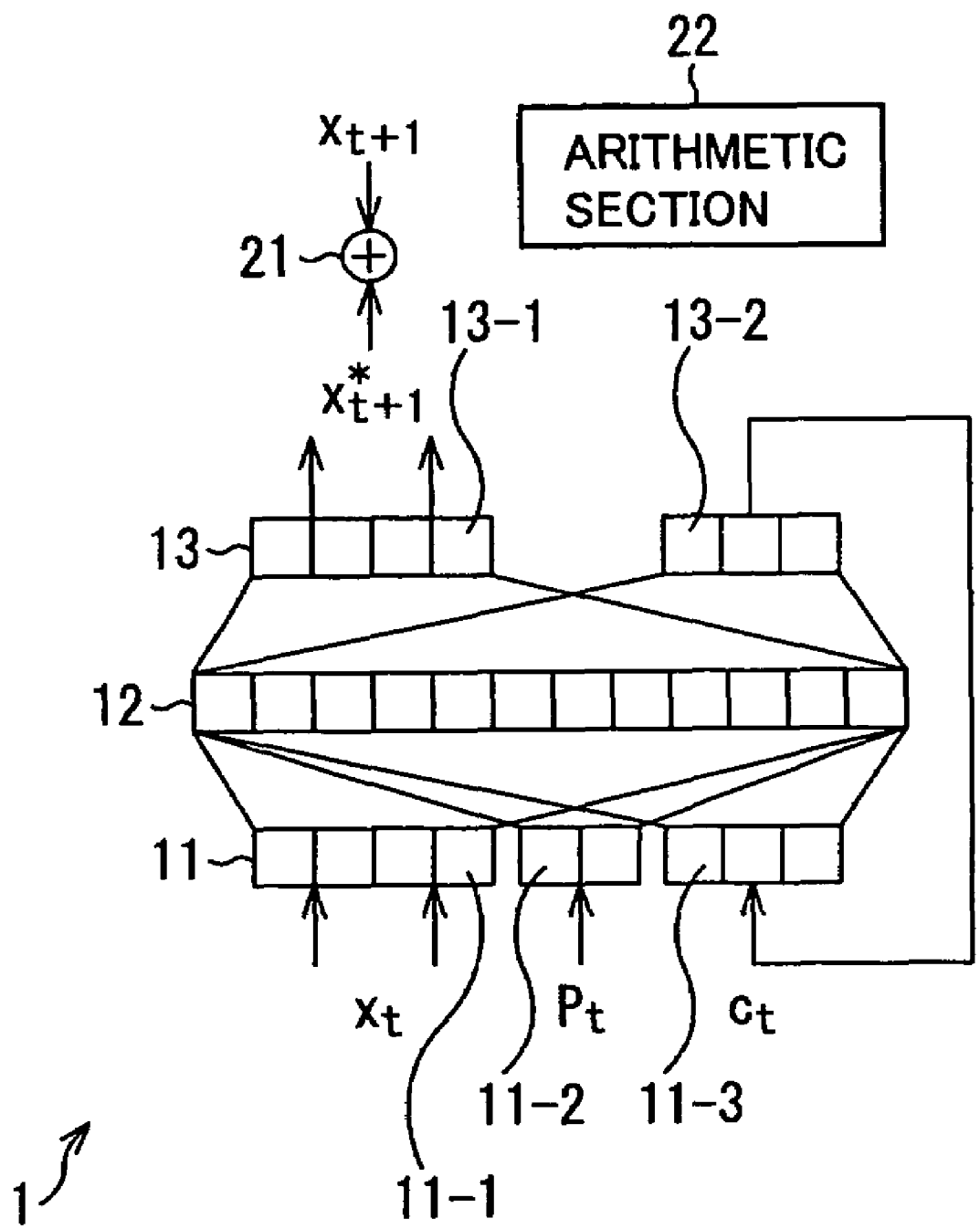
FIG. 1 is a view showing the structure of a recurrent neural network to which the present invention is applied.

FIG. 1 shows an exemplary structure of a recurrent neural network to which the present invention is applied. This recurrent neural network (RNN) 1 includes an input layer 11, an intermediate layer (hidden layer) 12, and an output layer 13. Each of these input layer 11, intermediate layer 12 and output layer 13 includes an arbitrary number of neurons.

Data $x_t$ related to a time series pattern is inputted to neurons 11-1, which constitute a part of the input layer 11. Specifically, for example, the data is related to a time series pattern such as a human physical movement pattern (for example, locus of movement of the hand position) acquired by image processing based on camera images. $P_t$ is a vector and its dimension is arbitrary depending on the time series pattern. The parameter $P_t$ is inputted to parametric bias nodes 11-2, which are neurons constituting a part of the input layer 11. The number of parametric bias nodes is one or more. It is desired that the number of parametric bias nodes is sufficiently small with respect to the total number of neuron that constitute the recurrent neural network and decide the number of weight matrixes, that is, a parameter of model decision means. In this embodiment, the number of parametric bias nodes is about one to two where the total number of such neurons is approximately 50. However, the invention of this application is not limited to this specific numbers. The parametric bias nodes are adapted for modulating a dynamic structure in a nonlinear dynamic system. In this embodiment, the parametric bias nodes are nodes that function to modulate a dynamic structure held by the recurrent neural network. However, this invention is not limited to the recurrent neural network. Moreover, data outputted from neurons 13-2, which constitute a part of the output layer 13, is fed back to neurons 11-3, which constitute a part of the input layer 11, as a context $C_t$ expressing the internal state of the RNN 1. The context $C_t$ is a common term related to the recurrent neural network and can be described in a reference literature (Elman, J. L. "Finding structure in time", Cognitive Science, 14, (1990), pages 179-211) and the like.

The neurons of the intermediate layer 12 execute weighted addition processing to inputted data and processing to sequentially output the processed data to the subsequent stage. Specifically, after arithmetic processing (arithmetic processing based on a nonlinear function) with a predetermined weighting coefficient is performed to the data $x_t$, $P_t$, and $C_t$, the processed data are outputted to the output layer 13. In this embodiment, for example, arithmetic processing based on a function having a nonlinear output characteristic such as a sigmoid function is performed to the input of a predetermined weighted sum of $x_t$, $P_t$, and $C_t$, and then the processed data is outputted to the output layer 13.

Neurons 13-1, which constitute a part of the output layer 13, output data $x^*_{t+1}$ corresponding to input data.

The RNN 1 also has an arithmetic unit 21 for learning based on back propagation. An arithmetic section 22 performs processing to set a weighting coefficient for the RNN 1.

The learning processing of the RNN 1 will now be described with reference to flowchart of FIG. 2.

Figure 2:
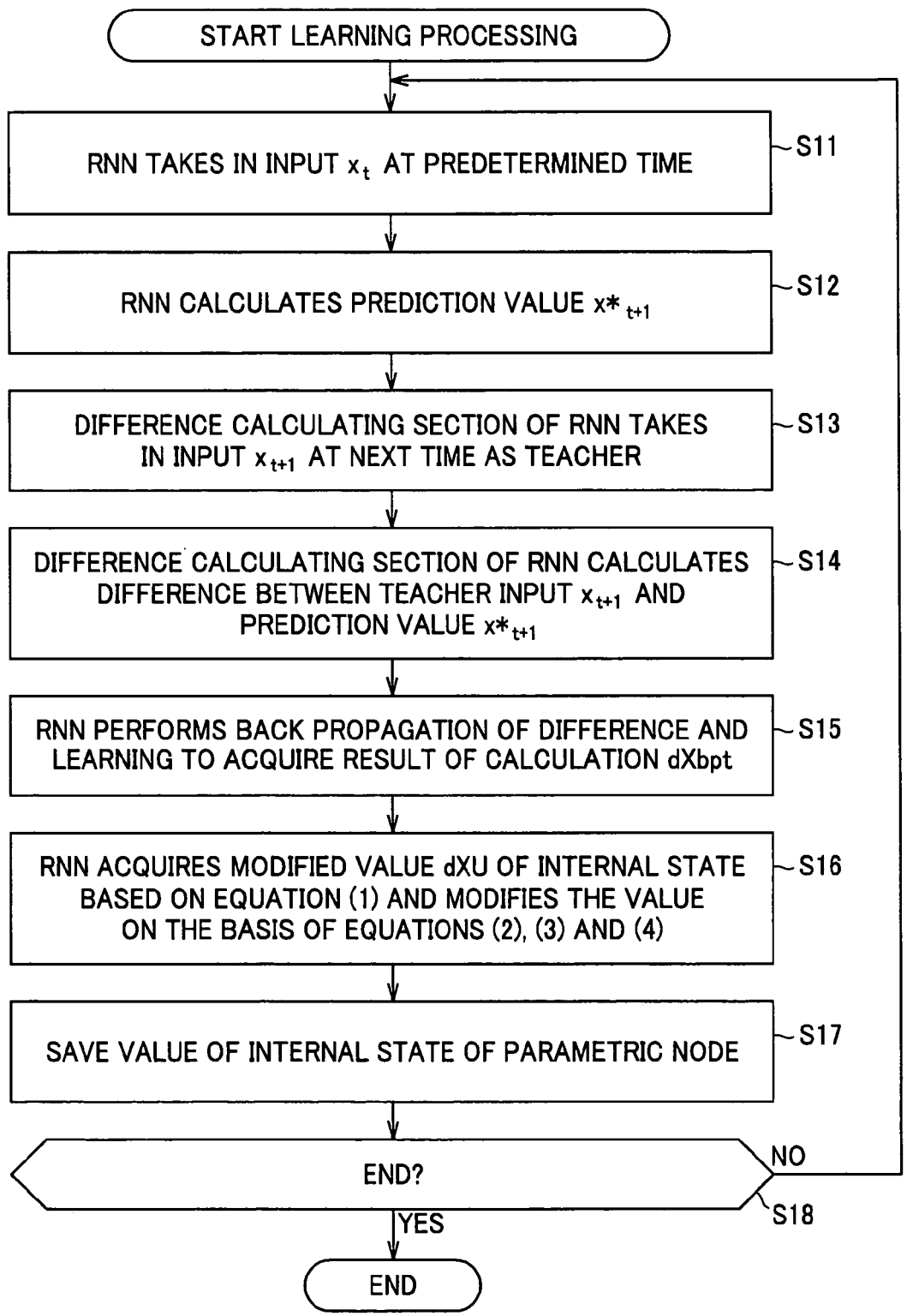
FIG. 2 is a flowchart for explaining learning processing of the recurrent neural network of FIG. 1.

The processing shown in the flowchart of FIG. 2 is executed with respect to each time series pattern to be learned. In other words, virtual RNNs corresponding to the number of time series patterns to be learned are prepared and the processing of FIG. 2 is executed with respect to each of the virtual RNNs.

After the processing shown in the flowchart of FIG. 2 is executed with respect to each of the virtual RNNs and a time series pattern is learned with respect to each virtual RNN, processing to set a coefficient to the actual RNN 1 is executed. In the following description, however, each virtual RNN is described as the actual RNN 1.

First, at step S11, the neurons 11-1 of the input layer 11 of the RNN 1 takes in an input $x_t$ at a predetermined time t. At step S12, the intermediate layer 12 of the RNN 1 performs arithmetic processing corresponding to a weighting coefficient to the input $x_t$, and a prediction value $x^*_{t+1}$ of a time series t+1 in the inputted time series pattern is outputted from the neurons 13-1 of the output layer 13.

At step S13, the arithmetic unit 21 takes in an input $x_{t+1}$ at the next time t+1, as teacher data. At step S14, the arithmetic unit 21 calculates the difference between the teacher input $x_{t+1}$ taken in by the processing of step S13 and the prediction value $x^*_{t+1}$ calculated by the processing of step S12.

At step S15, the RNN 1 inputs the difference calculated by the processing of step S14 from the neurons 13-1 of the output layer 13 and propagates it to the intermediate layer 12 and then to the input layer 11, thus performing learning processing. The result of calculation $dX_{bpt}$ is thus acquired.

At step S16, the intermediate layer 12 acquires a modified value dXU of the internal state based on the following equation (1).

$$dXU_t = k_{bp} \cdot \sum_{t-\frac{1}{2}}^{t+\frac{1}{2}} dX_{bpt} + k_{nb} \cdot (XU_{t+1} - XU_t + XU_{t-1} - XU_t) \qquad (1)$$

Moreover, the intermediate layer 12 modifies the modified value dXU on the basis of the following equations (2) to (4).

$$dlXU_t = \epsilon \cdot dXU_t + momentum \cdot dlXU_t \qquad (2)$$

$$XU_t = XU_t + dlXU_t \qquad (3)$$

$$X_t = sigmoid(XU_t) \qquad (4)$$

At step S17, the parametric nodes 11-2 execute processing to save the value of the internal state.

Next, at step S18, the RNN 1 judges whether to end the learning processing or not. If the learning processing is not to be ended, the RNN 1 returns to step S11 and repeats execution of the subsequent processing.

If it is judged at step S18 that the learning processing is to be ended, the RNN 1 ends the learning processing.

As the learning processing as described above is performed, one time series pattern is learned with respect to a virtual RNN.

Figure 3:
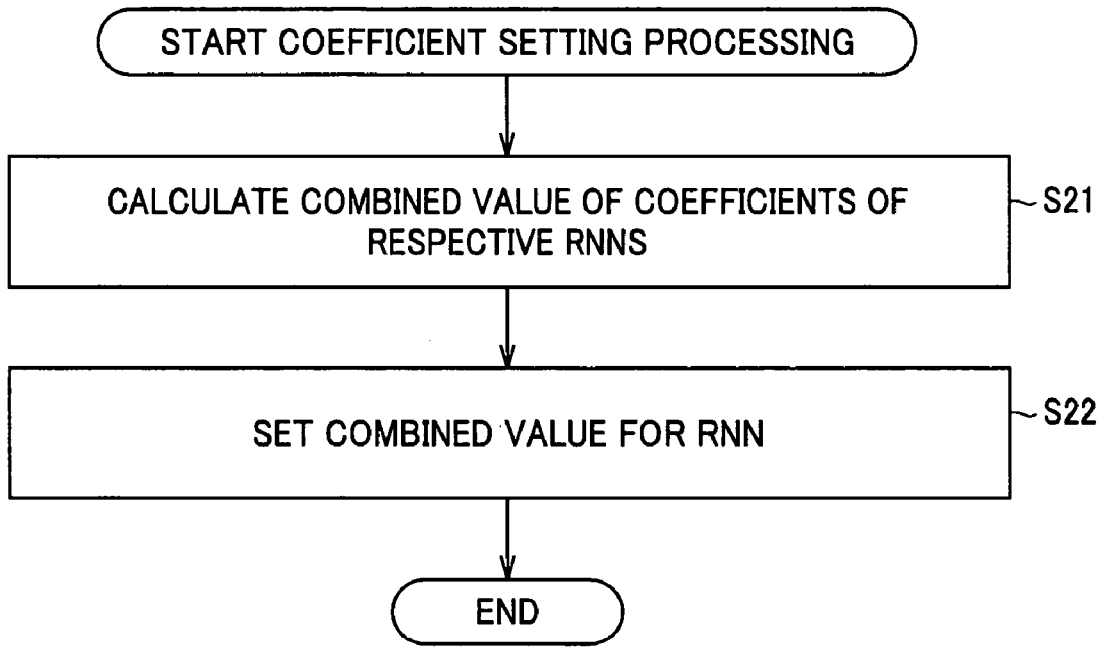
FIG. 3 is a flowchart for explaining coefficient setting processing of the recurrent neural network of FIG. 1.

After the learning processing as described above is performed for the virtual RNNs corresponding to the number of learning patterns, processing to set the weighting coefficient acquired from the learning processing, for the actual RNN 1, is performed. FIG. 3 shows the processing in this case.

At step S22, the arithmetic section 22 calculates a combined value of the coefficients acquired as a result of executing the processing shown in the flowchart of FIG. 2 with respect to each virtual RNN. As this combined value, for example, an average value can be used. That is, an average value of the weighting coefficients of the respective virtual RNNs is calculated here.

Next, at step S22, the arithmetic section 22 executes processing to set the combined value (average value) calculated by the processing of step S21, as a weighting coefficient for the neurons of the actual RNN 1.

Thus, the coefficient acquired by learning the plural time series patterns is set for each neuron of the intermediate layer 12 of the actual RNN 1.

Figure 4A:
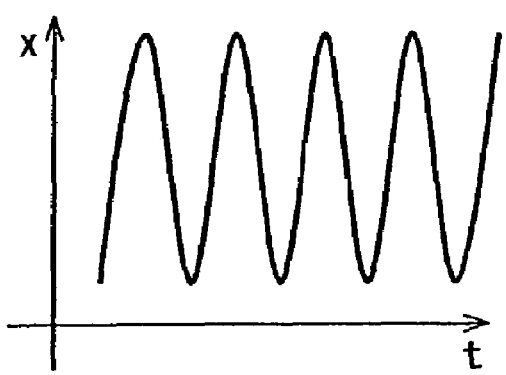
FIG. 4A is a view showing an exemplary time series pattern having different amplitude and the same cycle.
Figure 4B:
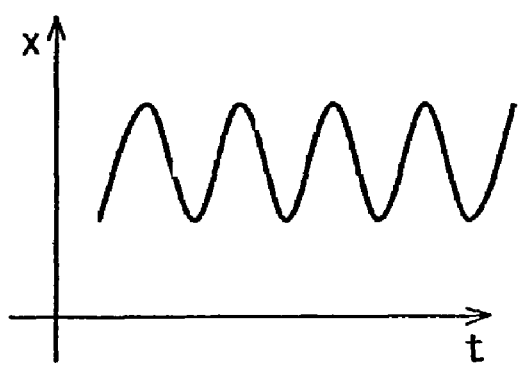
FIG. 4B is a view showing an exemplary time series pattern having different amplitude and the same cycle.
Figure 4C:
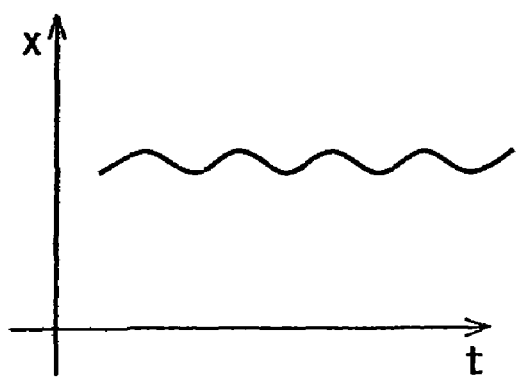
FIG. 4C is a view showing an exemplary time series pattern having different amplitude and the same cycle.
Figure 5A:
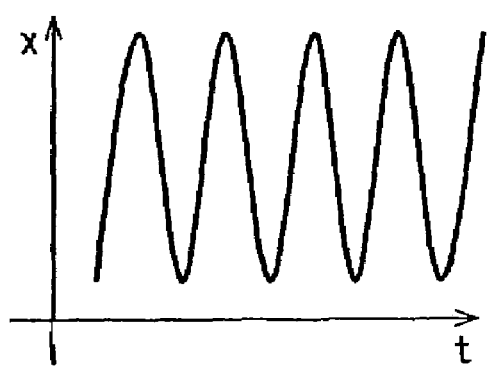
FIG. 5A is a view showing an exemplary time series pattern having a different cycle and the same amplitude.
Figure 5B:
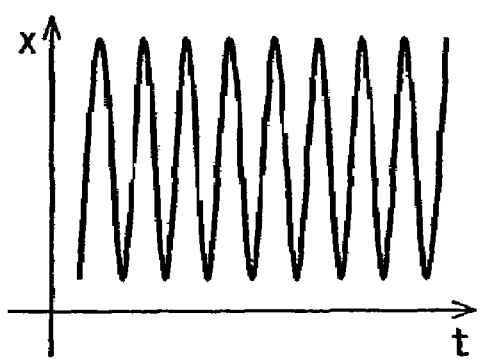
FIG. 5B is a view showing an exemplary time series pattern having a different cycle and the same amplitude.
Figure 5C:
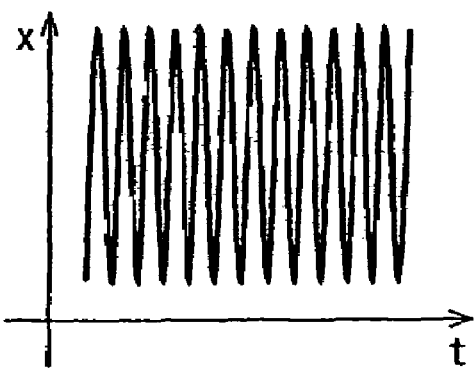
FIG. 5C is a view showing an exemplary time series pattern having a different cycle and the same amplitude.

The weighting coefficient for each neuron of the intermediate layer 12 holds information related to a shareable dynamic structure in order to generate plural teaching time series patterns, and the parametric bias nodes hold necessary information for switching the shareable dynamic structure to a dynamic structure suitable for generating each teaching time series pattern. An example of the "shareable dynamic structure" will now be described. For example, as shown in FIGS. 4A to 4C, when a time series pattern A and a time series pattern B having different amplitude and the same cycle are inputted, the cycle of an output time series pattern C is the shareable dynamic structure. On the other hand, as shown in FIGS. 5A to 5C, when a time series pattern A and a time series pattern B having different cycles and the same amplitude are inputted, the amplitude of an output time series pattern C is the shareable dynamic structure. However, the invention of this application is not limited to these examples.

Figure 6:
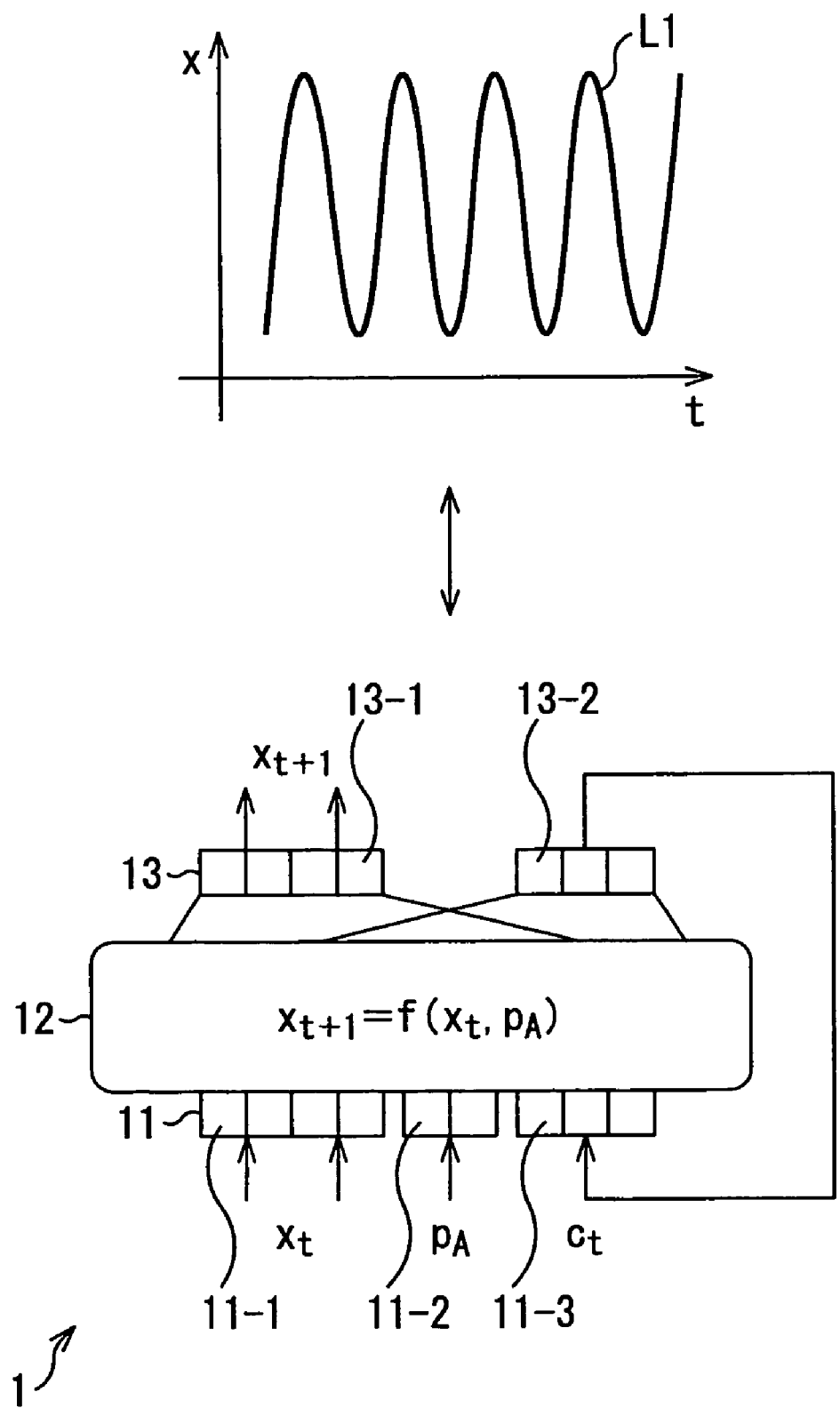
FIG. 6 is a view showing an exemplary learned pattern.

For example, as first data is inputted and learned, a time series pattern indicated by a curve L1 having relatively large amplitude is learned, as shown in FIG. 6.

Figure 7:
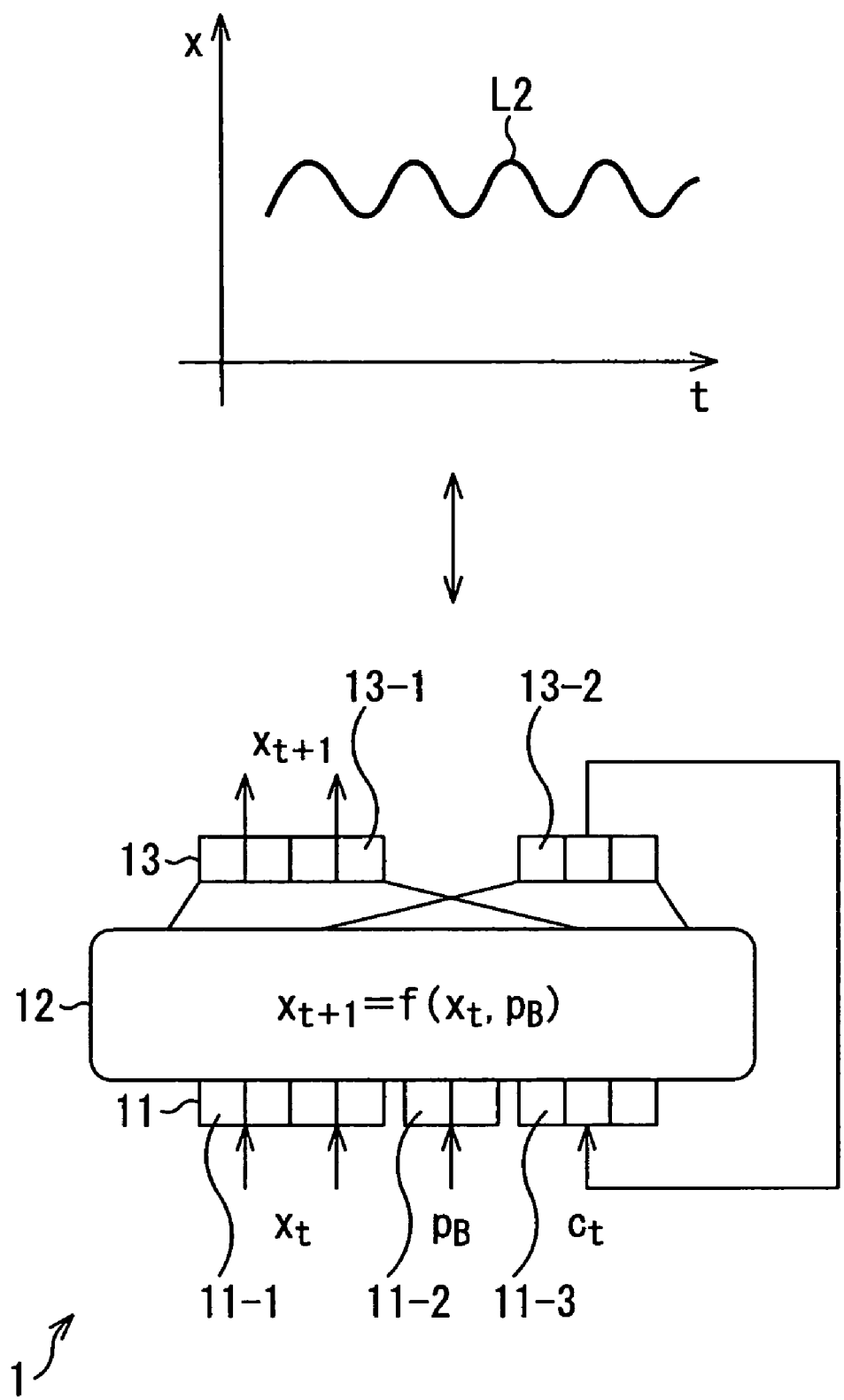
FIG. 7 is a view showing an exemplary learned pattern.

Similarly, as second data is inputted and learned, a time series pattern indicated by a curve L2 having relatively small amplitude is learned, as shown in FIG. 7.

Figure 8:
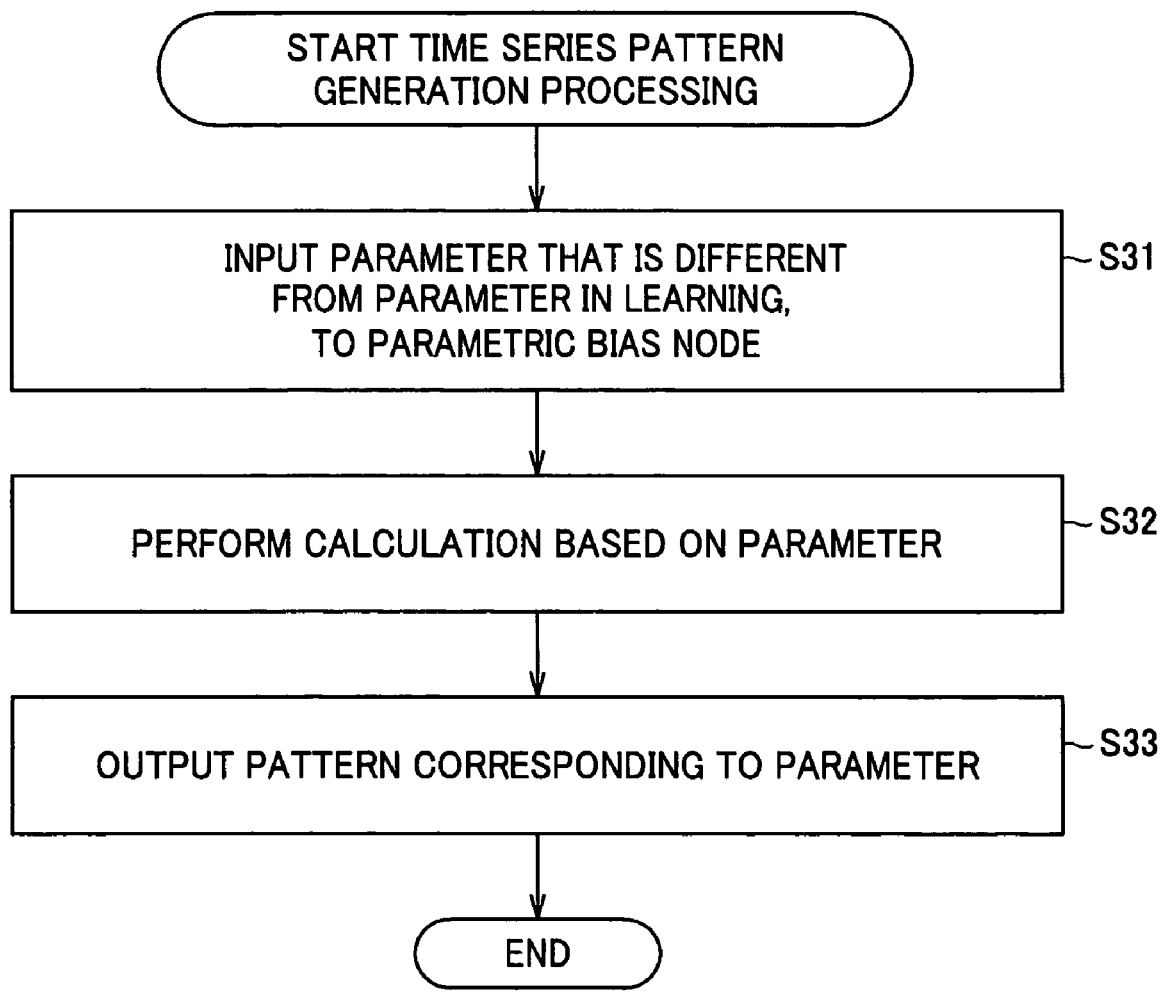
FIG. 8 is a flowchart for explaining time series pattern generation processing of the recurrent neural network of FIG. 1.

When generating a new time series pattern in the RNN 1 after such time series patterns are learned, processing as shown in the flowchart of FIG. 8 is executed.

Specifically, first, at step S31, the parametric bias nodes 11-2 input a parameter that is different from the parameter in learning. At step S32, the intermediate layer 12 performs calculation based on a weighting coefficient with respect to the parameter inputted to the parametric bias nodes 11-2 by the processing of step S31. Specifically, inverse operation of the operation for calculating the parameter value in learning is carried out.

Figure 9:
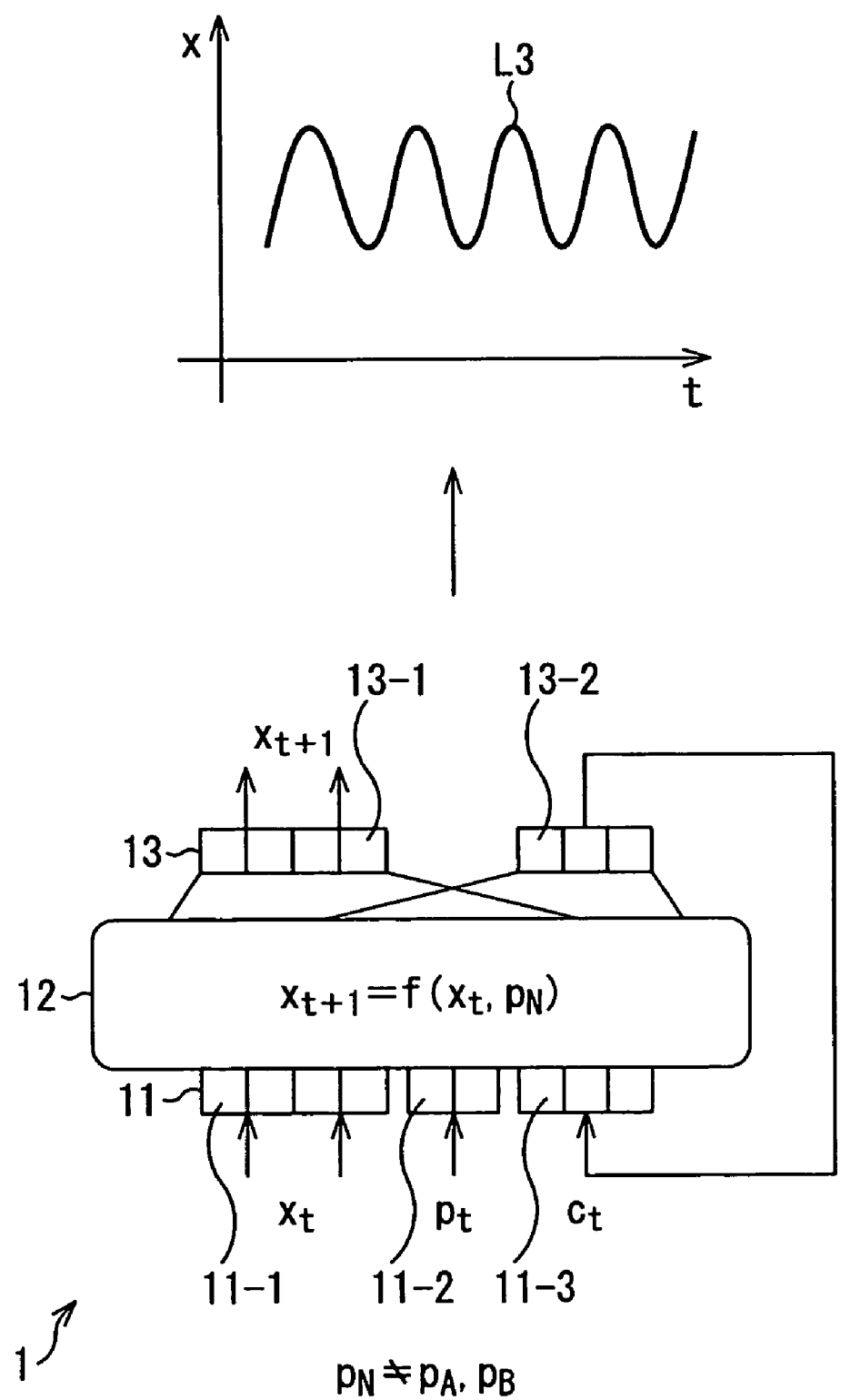
FIG. 9 is a view showing an exemplary time series pattern to be generated.

FIG. 9 shows an example in the case a parameter $P_N$ is inputted as a parameter $P_t$ to the parametric bias nodes 11-2 of the RNN 1 after the RNN 1 is caused to learn the time series patterns shown in FIGS. 6 and 7. This parameter $P_N$ has a value that is different from a parameter $P_A$ outputted to the parametric bias nodes 11-2 in pattern learning of FIG. 6 and a parameter $P_B$ outputted in time series pattern learning shown in FIG. 7. That is, in this case, the value of the parameter $P_N$ is an intermediate value between the values of the parameters $P_A$ and $P_B$.

In this case, the time series pattern outputted from the neurons 13-1 of the output layer 13 is a time series pattern indicated by a curve L3 in FIG. 9. The amplitude of this curve L3 is smaller than the amplitude of the curve L1 of the time series pattern A shown in FIG. 6 and larger than the amplitude of the curve L2 of the time series pattern B shown in FIG. 7. In other words, the amplitude of the curve L3 has an intermediate value between the amplitude of the curve L1 and the amplitude of the curve L2. That is, in this example, the curve L3, which is an intermediate curve between the curve L1 and the curve L2 shown in FIGS. 6 and 7, is linearly interpolated.

Hereinafter, the result of experiments will be described with reference to FIGS. 10 to 28.

FIGS. 10 to 13 show error (FIG. 10), target (input data) (FIG. 11), output (FIG. 12), and parametric bias (parameter) (FIG. 13) in the case the RNN 1 is caused to learn a first time series pattern. The vertical axes in FIGS. 10 to 13 represent respective values (normalized values), and the horizontal axes represent steps.

Figure 10:
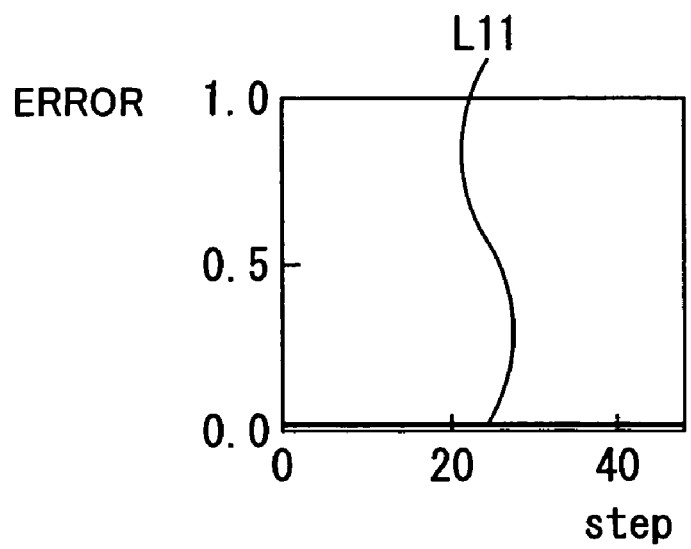
FIG. 10 is a view showing change of error in the case of causing the neural network to learn a first pattern.

When learning the first pattern, the error is almost 0.0 as indicated by a line L11 in FIG. 10. The target (input pattern) is a sine wave as indicated by a line L12 in FIG. 11.

Figure 11:
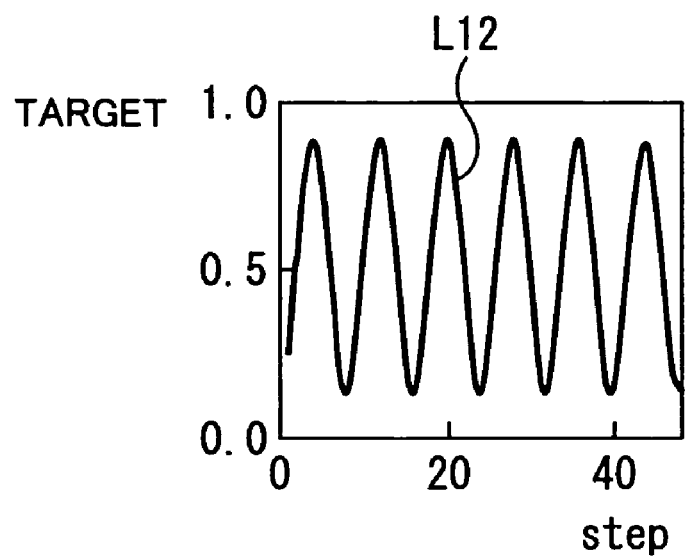
FIG. 11 is a view showing a target in the case of causing the neural network to learn the first pattern.
Figure 12:
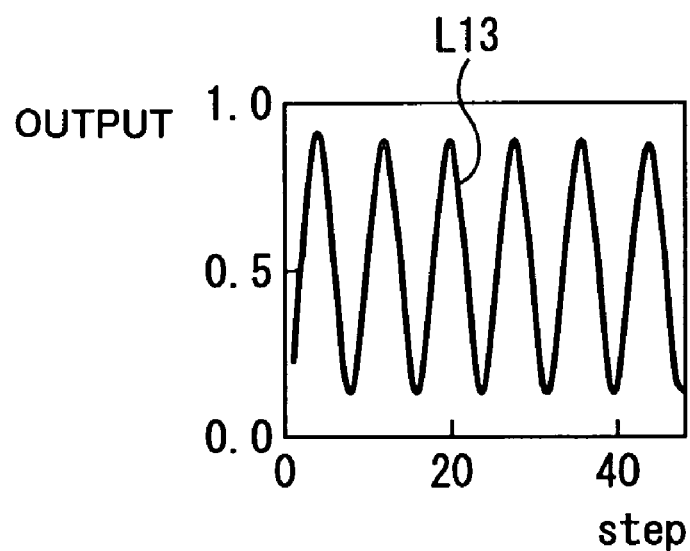
FIG. 12 is a view showing an output in the case of causing the neural network to learn the first pattern.

The output corresponding to the target shown in FIG. 11 is a curve (sine wave) substantially corresponding to the curve L12 as a target, as indicated by a curve L13 in FIG. 12.

Figure 13:
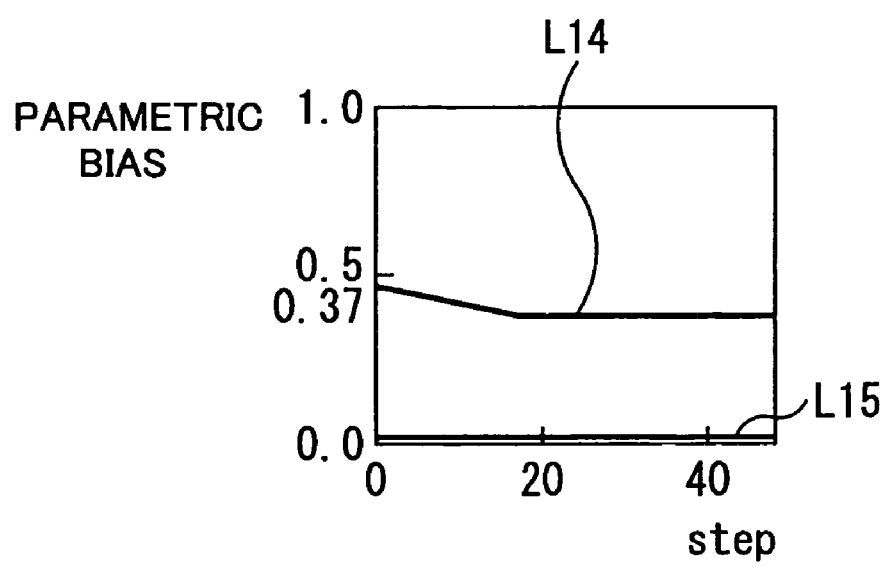
FIG. 13 is a view showing change of parametric bias in the case of causing the neural network to learn the first pattern.

One of the two parametric bias (parameter) values converges approximately at a value of 0.37 as indicated by a curve L14 in FIG. 13, and the other is constant substantially at 0.0 as indicated by a curve L15.

FIGS. 14 to 17 show error (FIG. 14), target (FIG. 15), output (FIG. 16), and parametric bias (parameter) (FIG. 17) in the case the RNN 1 is caused to learn a second time series pattern.

Figure 14:
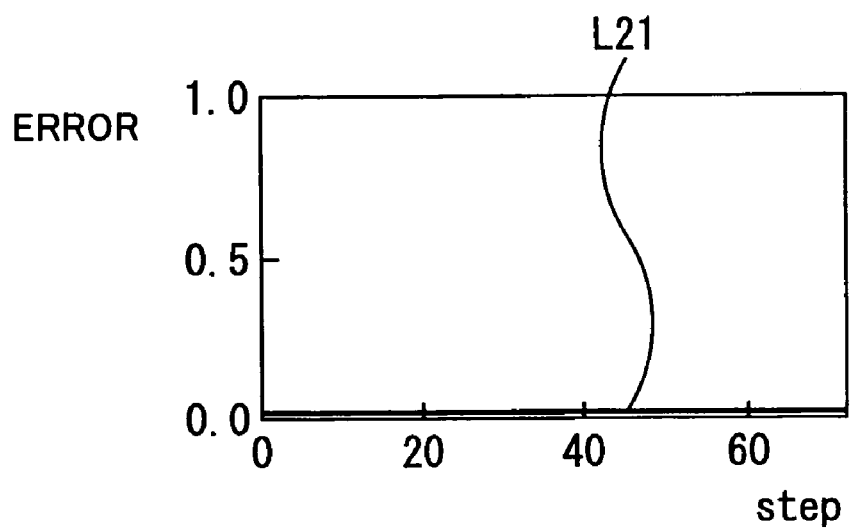
FIG. 14 is a view showing change of error in the case of causing the neural network to learn a second pattern.
Figure 15:
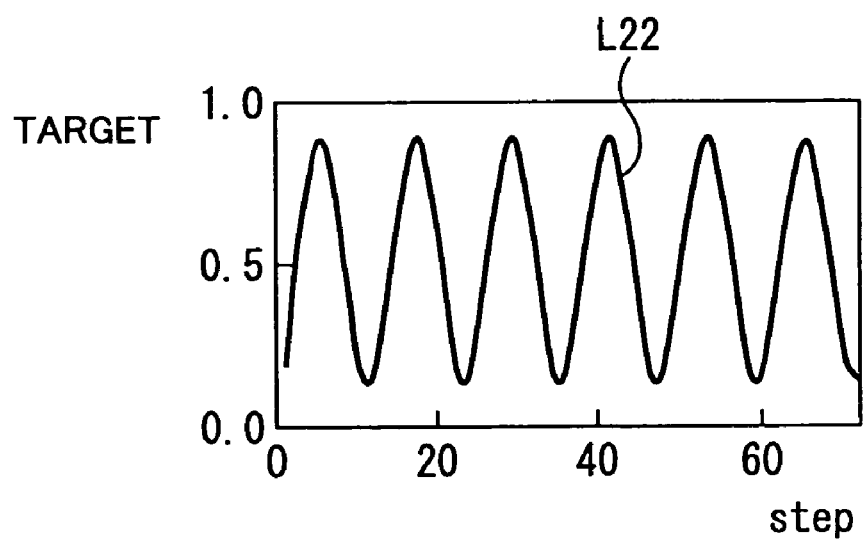
FIG. 15 is a view showing a target in the case of causing the neural network to learn the second pattern.

The error is constant substantially at 0.0 as indicated by a line L21 in FIG. 14. The target is a substantially sine wave-like time series pattern as indicated by a curve L22 in FIG. 15. In FIG. 15, as is clear from the comparison with FIG. 11, the amplitude of the curve L22 is substantially the same as the amplitude of the curve L12, but the cycle of the curve L22 is longer than the cycle of the curve L12 (that is, the frequency of the curve L22 is lower).

Figure 16:
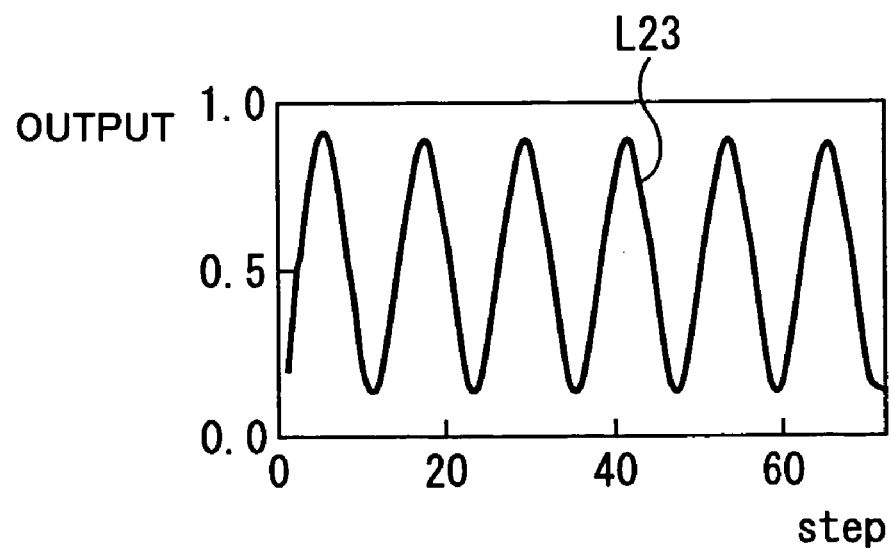
FIG. 16 is a view showing an output in the case of causing the neural network to learn the second pattern.

In accordance with the target shown in FIG. 15, the output of the curve 23 substantially corresponding to the curve L22 is acquired, as shown in FIG. 16.

Figure 17:
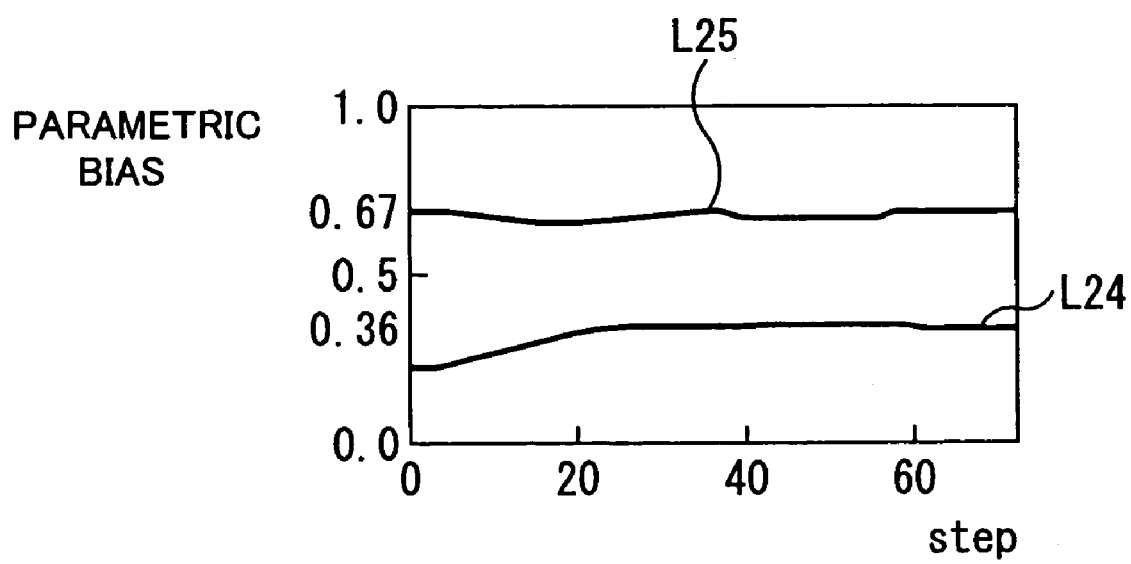
FIG. 17 is a view showing change of parametric bias in the case of causing the neural network to learn the second pattern.

In the case the second time series pattern is learned, one of the two parametric bias values converges substantially at a value of 0.36 as indicated by a curve L24 in FIG. 17, and the other value converges substantially at a value of 0.67 as indicated by a curve L25.

FIGS. 18 to 21 show error (FIG. 18), target (FIG. 19), output (FIG. 20), and parametric bias (FIG. 21) in the case the RNN 1 is caused to learn a third time series pattern.

Figure 18:
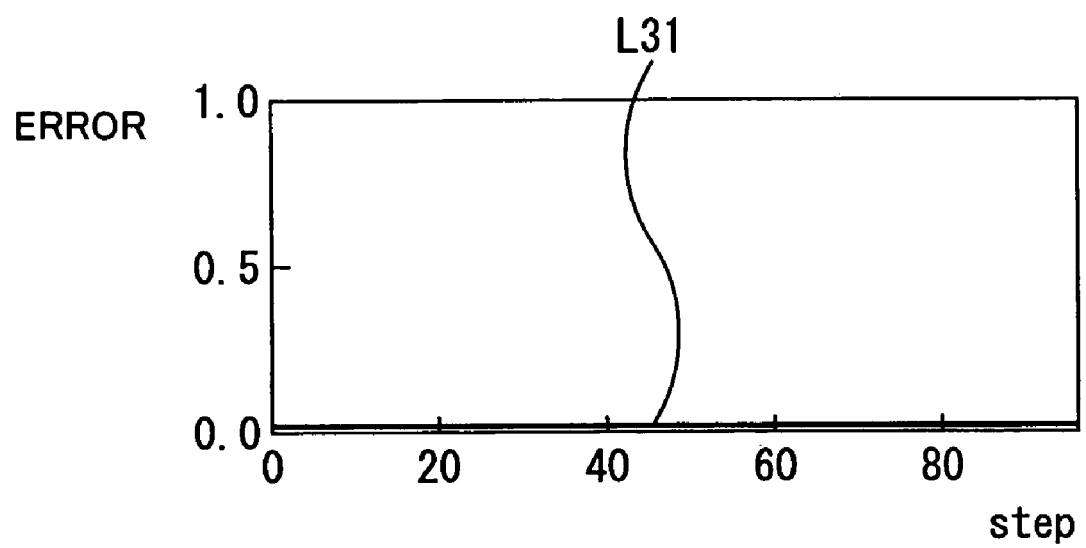
FIG. 18 is a view showing change of error in the case of causing the neural network to learn a third pattern.

The error in learning is substantially 0.0 as indicated by a curve L31 in FIG. 18. The target is a substantially sine wave-like signal as indicated by a curve L32. As is clear from the comparison with the curve L12 in FIG. 11 and the curve L22 in FIG. 15, the amplitude of the curve L32 is substantially the same as the amplitude of the curve L12 and the curve L22, but its cycle is longer than that of the curve L22 (that is, the frequency of the curve 32 is lower than that of the curve L22).

Figure 19:
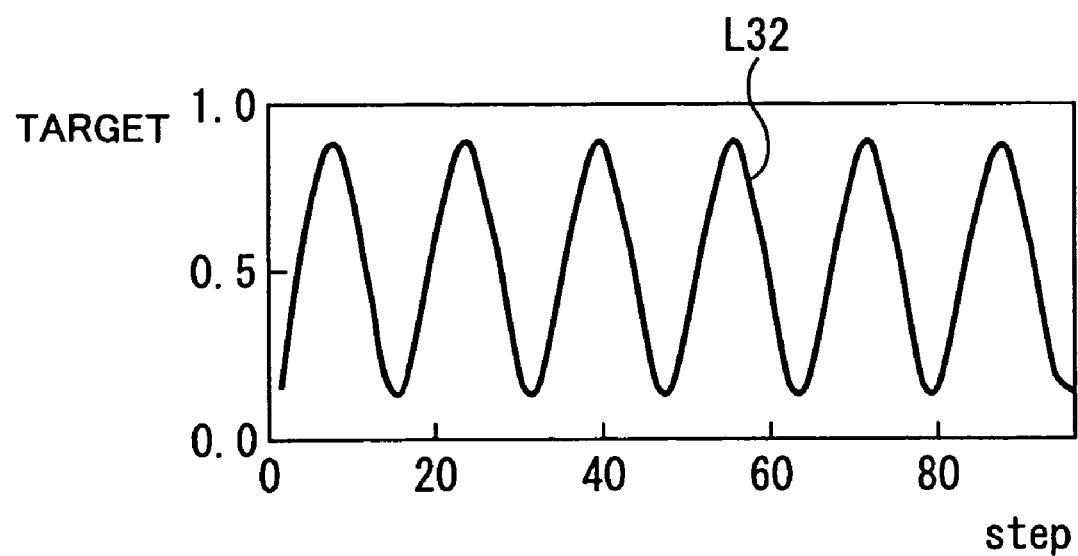
FIG. 19 is a view showing a target in the case of causing the neural network to learn the third pattern.
Figure 20:
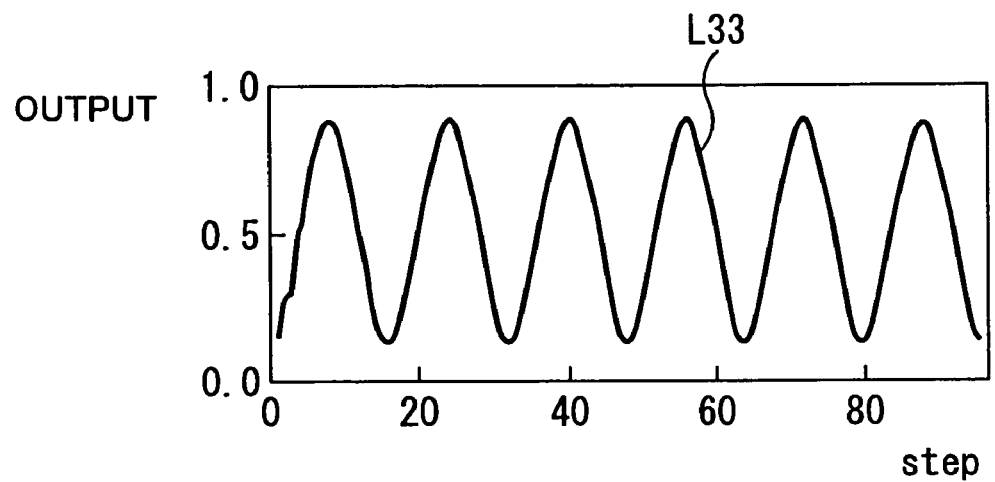
FIG. 20 is a view showing an output in the case of causing the neural network to learn the third pattern.

As shown in FIG. 20, a curve L33 of output is a sine wave-like curve substantially corresponding to the curve L32 of the target shown in FIG. 19.

Figure 21:
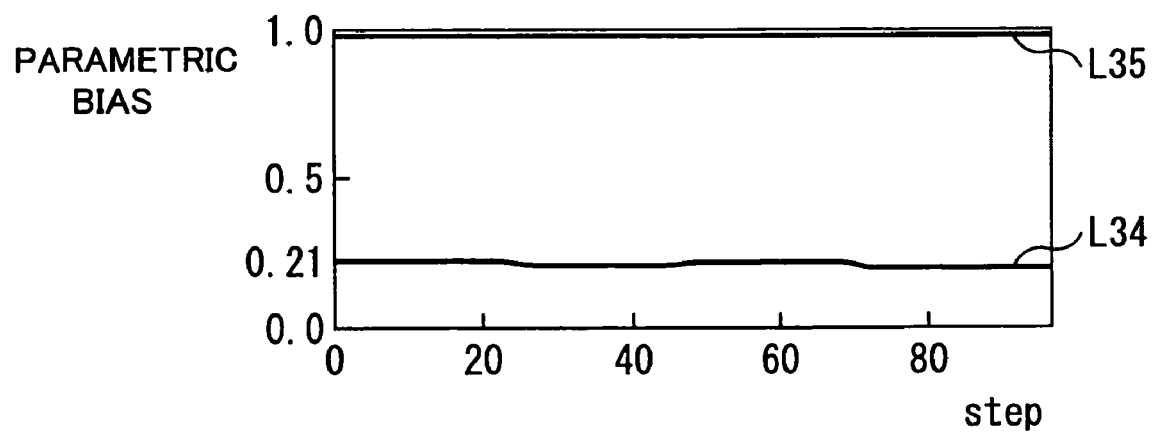
FIG. 21 is a view showing change of parametric bias in the case of causing the neural network to learn the third pattern.

In the case the third time series pattern is learned, one of the parametric bias values is substantially 0.21 as indicated by a curve L34 in FIG. 21, and the other value is constant substantially at 1.00 as indicated by a curve L35.

Figure 22:
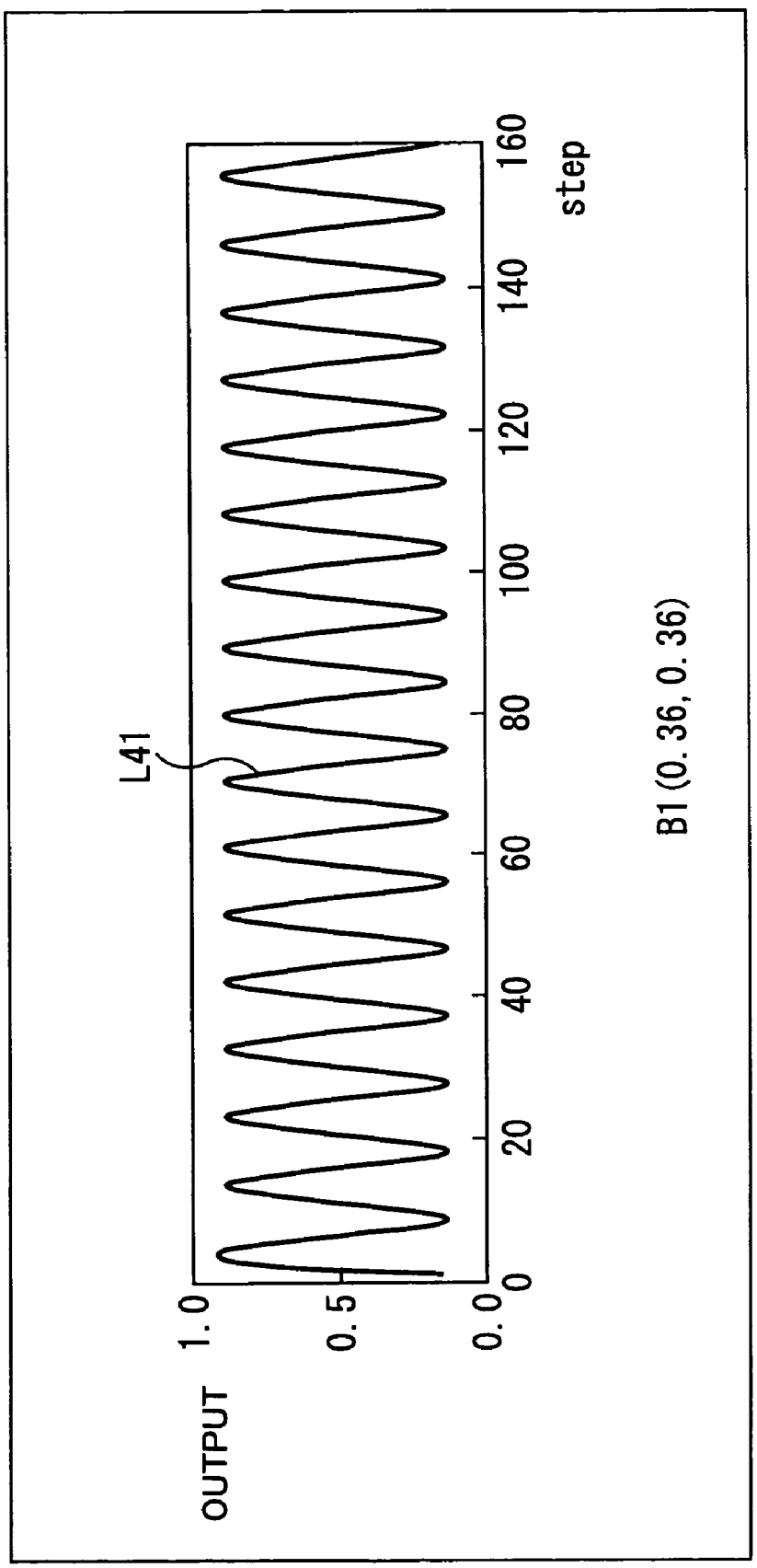
FIG. 22 is a view showing an example of generated pattern.

As the RNN 1 was caused to learn three time series patterns as shown in FIGS. 11, 15 and 19 and two values of 0.36 and 0.36 were inputted to the parametric bias nodes 11-2 of the RNN 1 as parametric bias (parameters), a time series pattern indicated by a curve L41 in FIG. 22 was outputted from the neurons 13-1 constituting the output layer 13.

Figure 23:
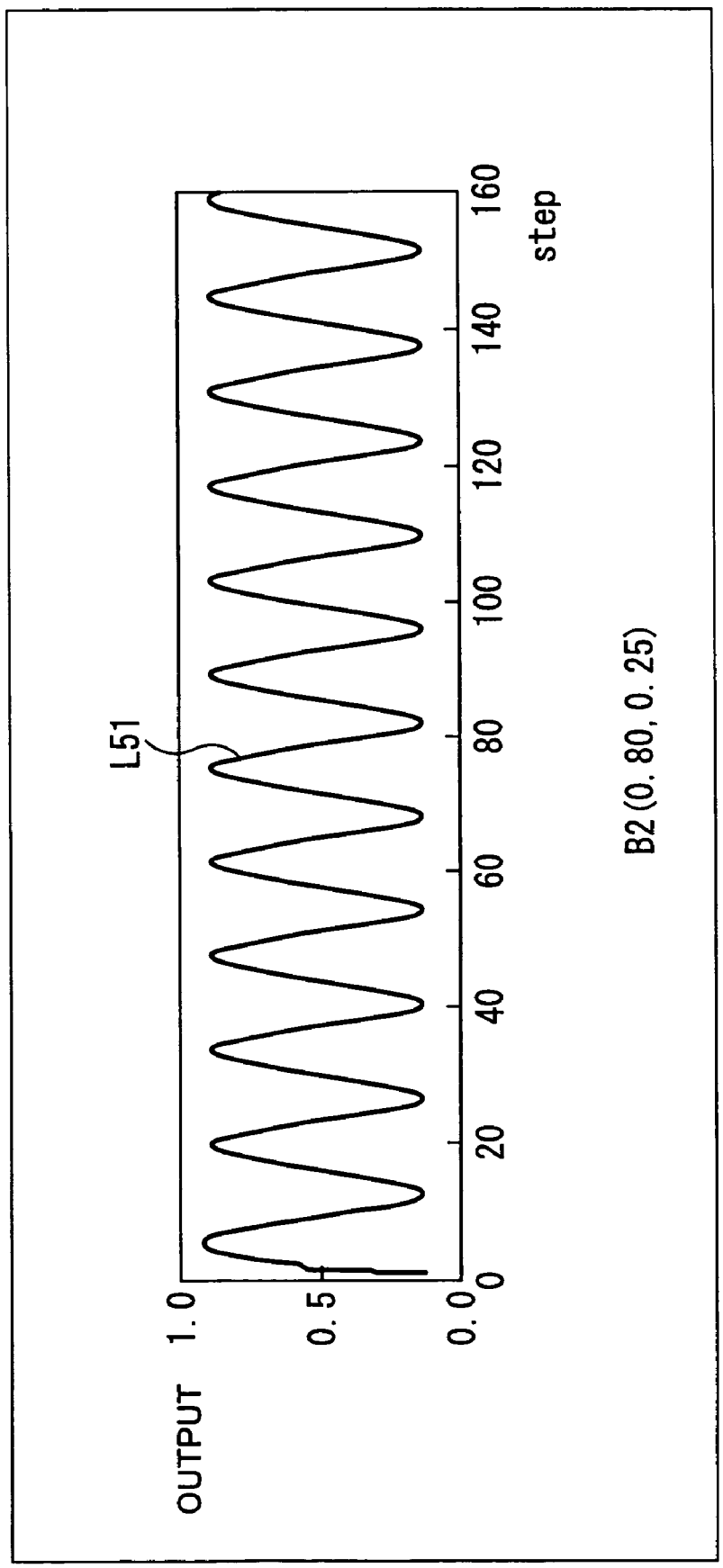
FIG. 23 is a view showing another example of generated pattern.

Similarly, when values of 0.80 and 0.25 were inputted as parameters, a pattern as indicated by a curve L51 in FIG. 23 was generated. For comparison, FIGS. 24 to 26 show time series patterns corresponding to the targets shown in FIGS. 11, 15 and 19.

Figure 24:
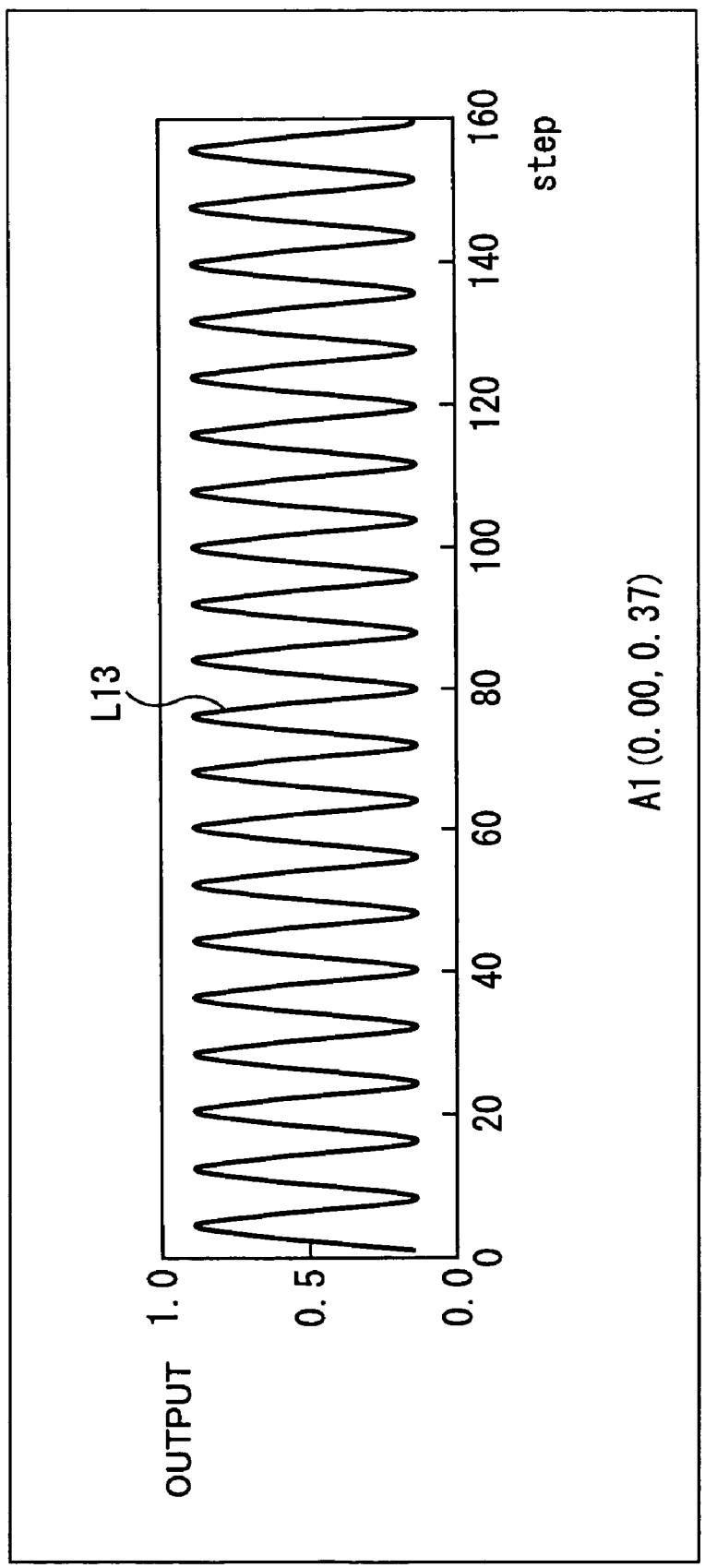
FIG. 24 is a view showing an output corresponding to FIG. 12.
Figure 25:
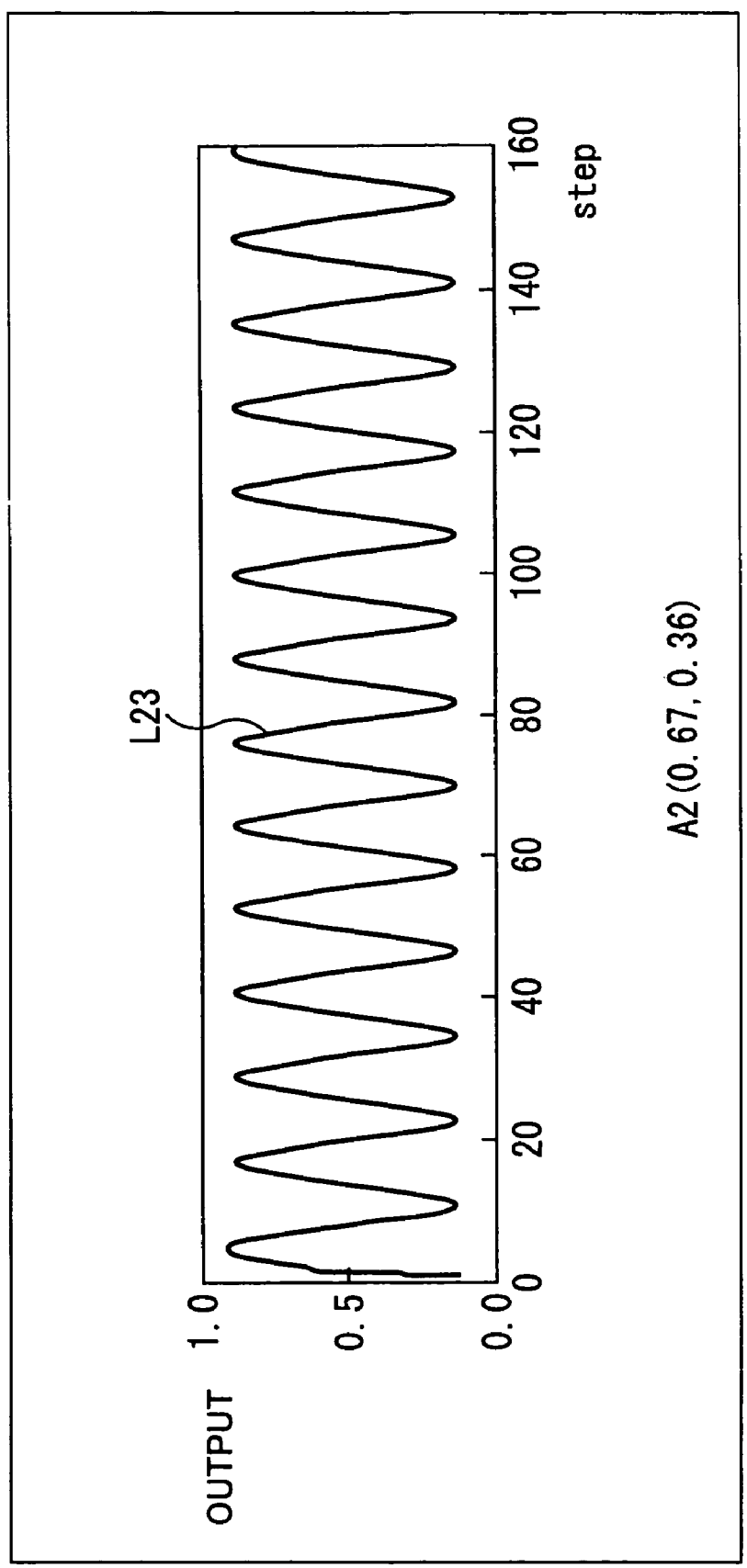
FIG. 25 is a view showing an output corresponding to FIG. 16.
Figure 26:
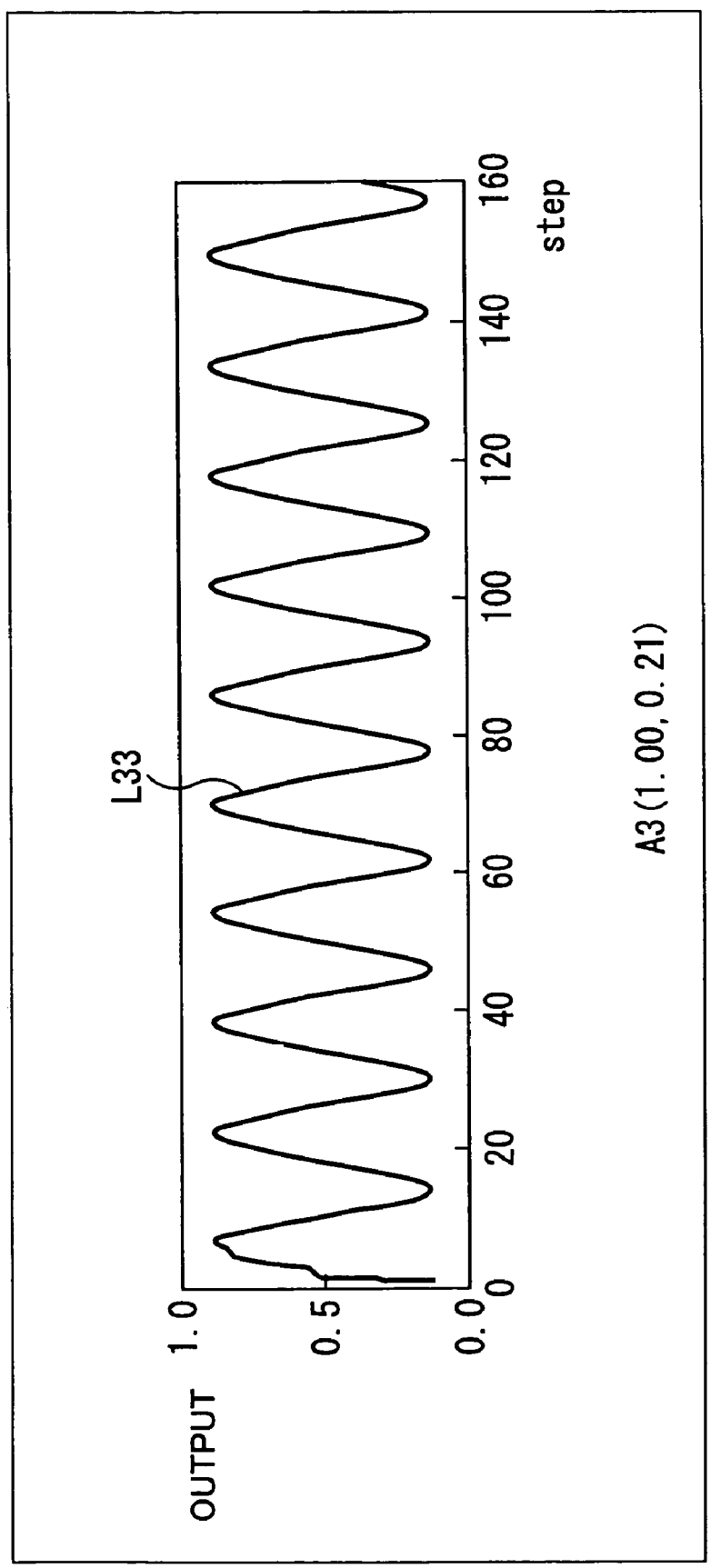
FIG. 26 is a view showing an output corresponding to FIG. 20.

As is clear from the comparison of these, the amplitude of the curve L41 of FIG. 22 is substantially the same as the amplitude of the curves L13, L23 and L33 of FIGS. 24 to 26. However, the cycle of the curve L41 is longer than the cycle of the curve L13 of FIG. 24 and shorter than the cycle of the curve L23 of FIG. 25.

This is because the parameters (0.36, 0.36) of FIG. 24 are intermediate values between the parameters (0.00, 0.37) of FIG. 24 and the parameters (0.67, 0.36) of FIG. 25.

The amplitude of the curve L51 of FIG. 23 is substantially the same as the amplitude of the curves L13, L23 and L33 of FIGS. 24 to 26 but its cycle is longer than that of the curve L23 of FIG. 25 and shorter than the curve L33 of FIG. 26.

This is because the values of the parameters (0.80, 0.25) of FIG. 23 are intermediate values between the parameters (0.67, 0.36) of FIG. 25 and the parameters (1.00, 0.01) of FIG. 26.

Figure 27:
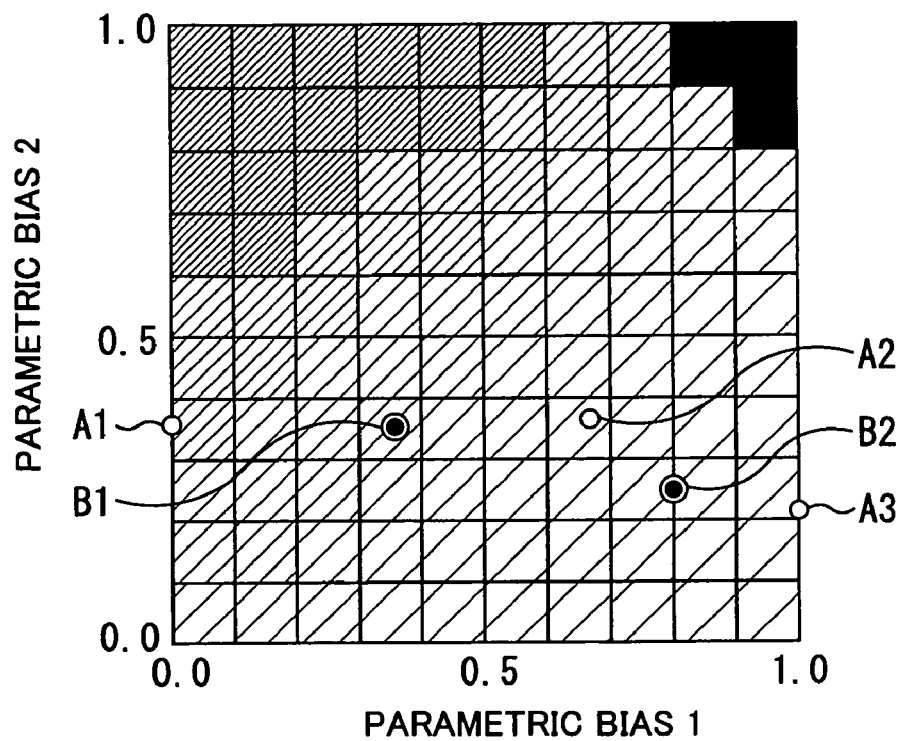
FIG. 27 is a view showing the relation between change of the cycle of the patterns of FIGS. 22 to 26 and the parametric bias.

FIG. 27 is a graph showing a cycle where one of the parametric bias values is plotted on the horizontal axis and the other value is plotted on the vertical axis. Points A1, A2, A3, B1 and B2 in FIG. 27 represent the plotted parameter values corresponding to FIG. 24 (A1), FIG. 25 (A2), FIG. 26 (A3), FIG. 22 (B1) and FIG. 22 (B2). In FIG. 27, the same density indicates the same cycle. The gradation of color means smooth change of the cycle corresponding to the parametric bias values.

Figure 28:
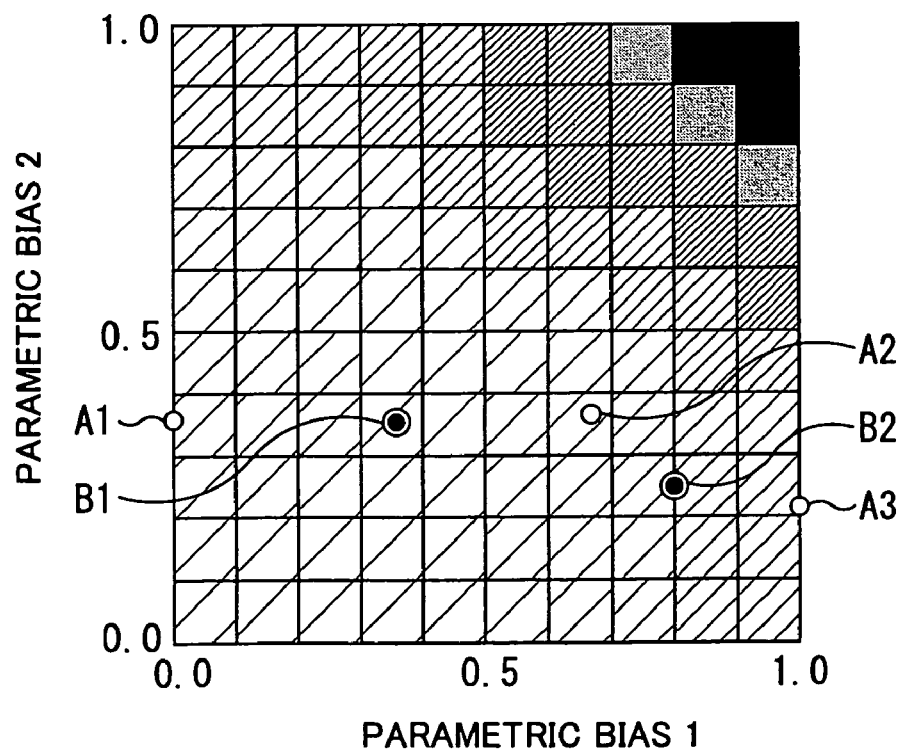
FIG. 28 is a view showing the relation between change of the amplitude of the patterns of FIGS. 22 to 26 and the parametric bias.

FIG. 28 shows change of the amplitude corresponding to two parametric bias values. As is clear from FIG. 28, the amplitude changes substantially smoothly in accordance with the parametric bias values.

In the above-described example, the RNN 1 is caused to learn linear time series patterns. However, similar results were obtained when the RNN 1 was caused to learn non-linear time series patterns.

Figure 29:
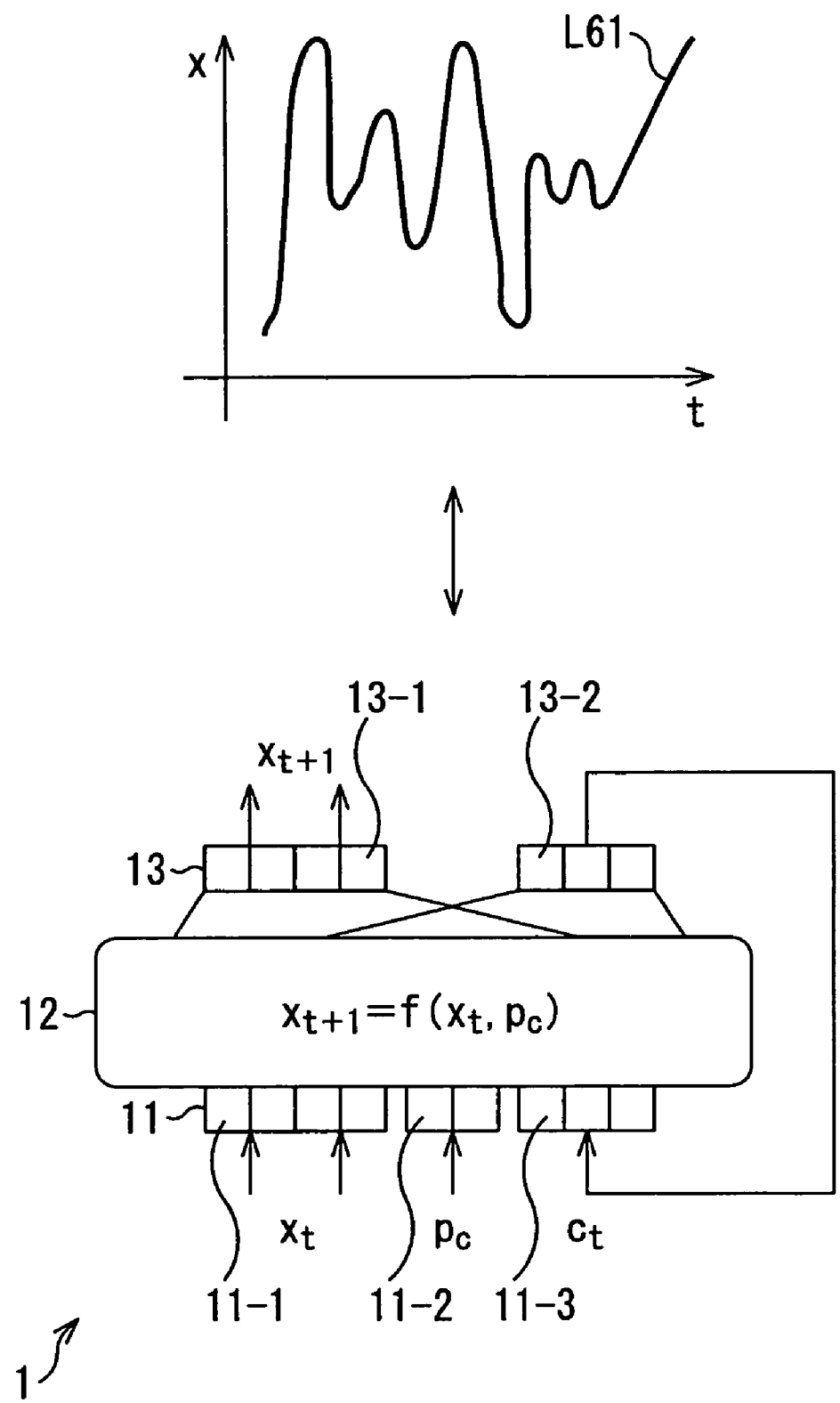
FIG. 29 is a view showing an exemplary pattern to be learned.
Figure 30:
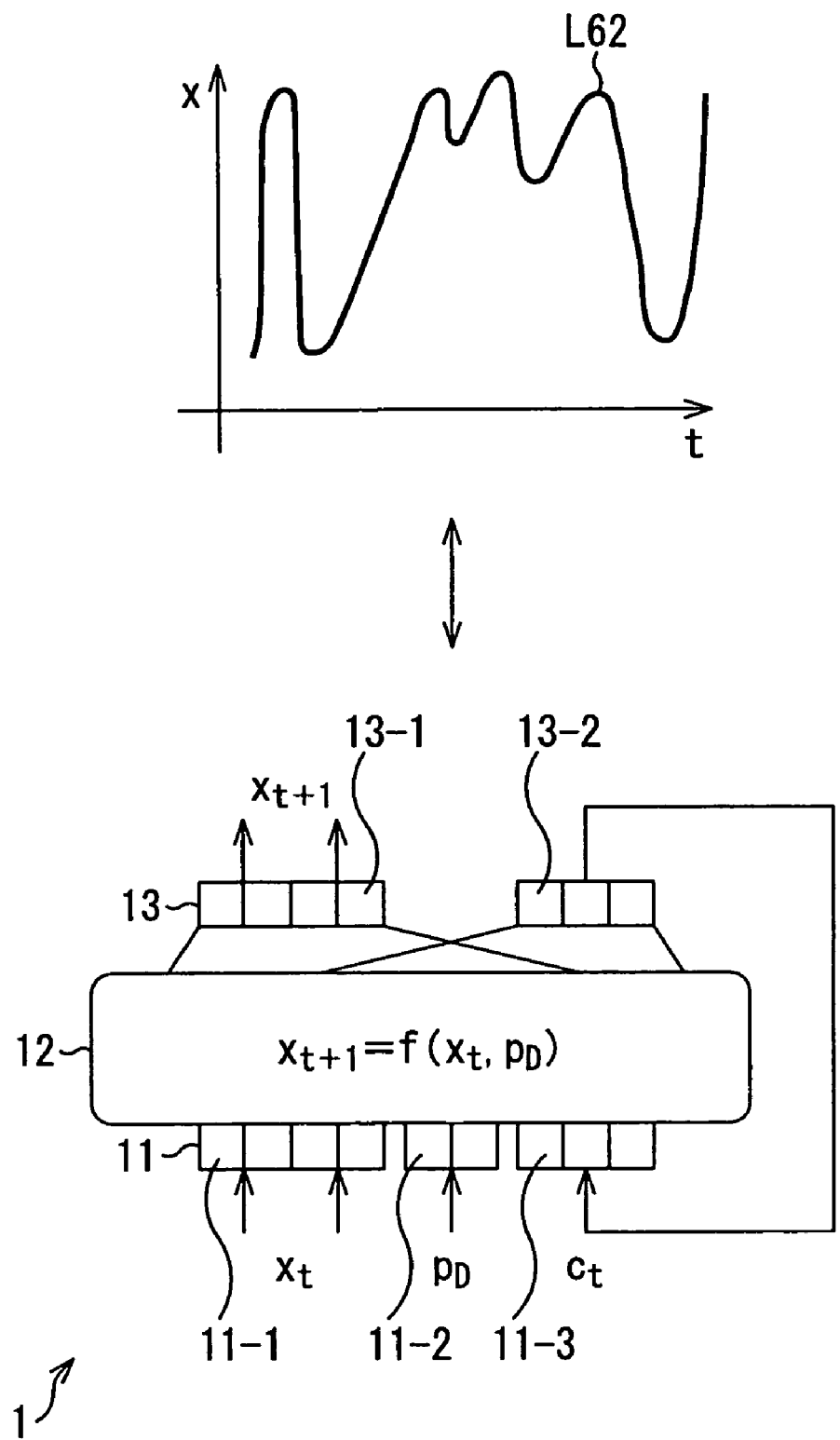
FIG. 30 is a view showing another exemplary pattern to be learned.
Figure 31:
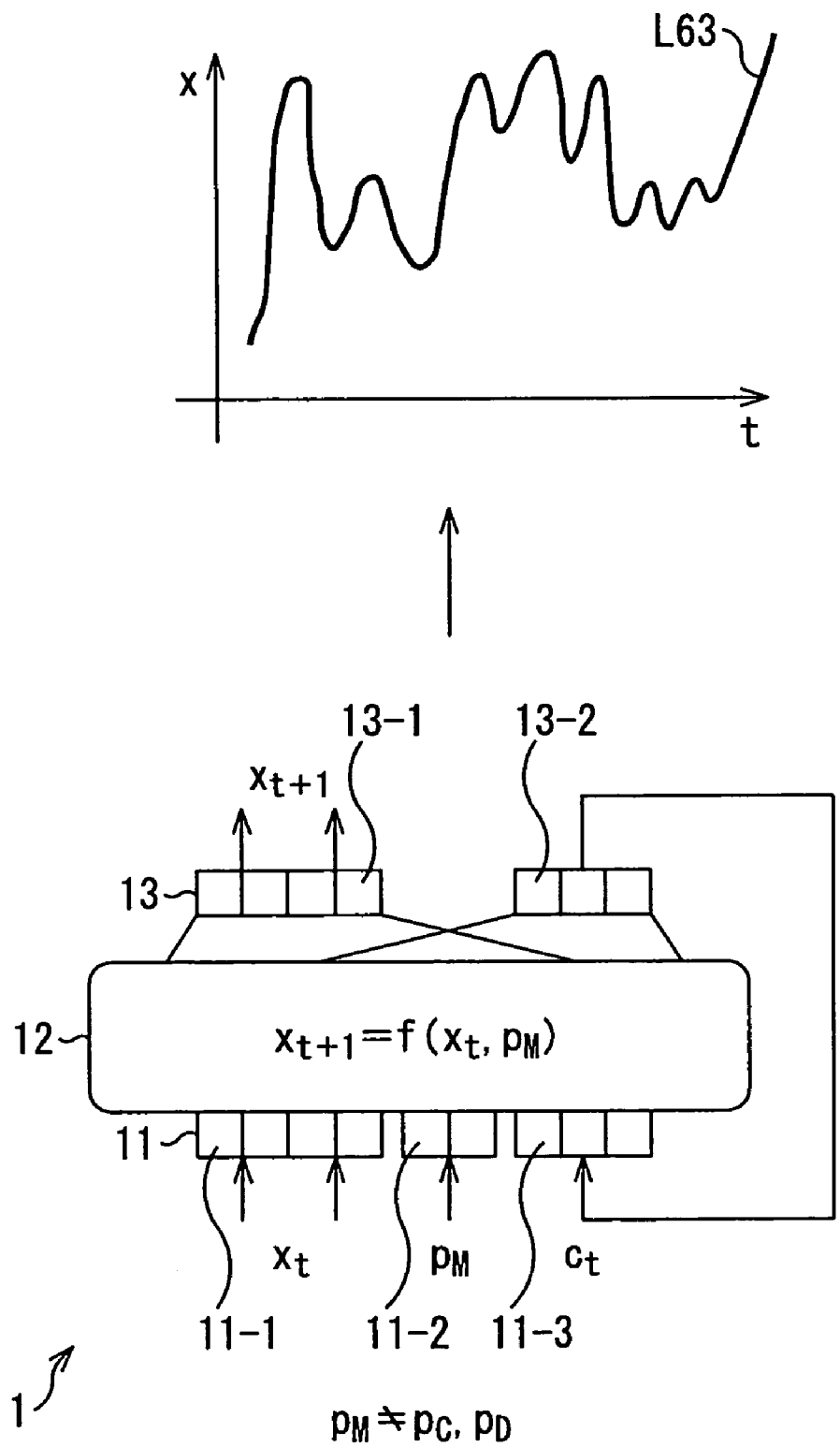
FIG. 31 is a view showing a pattern generated when the patterns shown in FIGS. 29 and 30 are learned.
Figure 32:
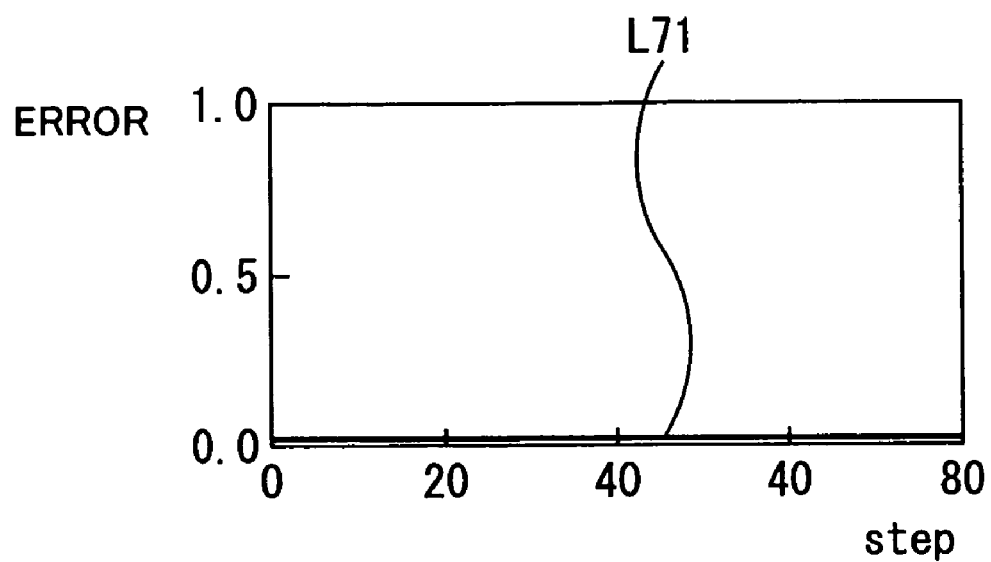
FIG. 32 is a view showing change of error in the case of causing the neural network to learn a fourth pattern.

Specifically, after the RNN 1 is caused to learn a time series pattern as indicated by a curve L61 in FIG. 29 and a time series pattern as indicated by a curve L62 in FIG. 30, a parameter $P_M$ that is different from a parameter $P_C$ acquired when learning the curve L61 of FIG. 29 and a parameter $P_D$ acquired when learning the pattern of the curve L62 of FIG. 30 is inputted as a parameter to the parametric bias nodes 11-2 of the RNN 1. Then, a new pattern that is different from the curve L61 of FIG. 29 and the curve L62 of FIG. 30 can be generated, as indicated by a curve L63.

Specific examples will now be described.

FIGS. 32 to 35 show error (FIG. 32), target (FIG. 33), output (FIG. 34), and parametric bias (FIG. 35) in the case the RNN 1 is caused to learn a fourth pattern.

When learning the fourth time series pattern, the error is almost 0.0 as indicated by a curve L71. The target is a sine wave as indicated by a curve L72. The corresponding output is indicated by a curve L73. This curve L73 substantially corresponds to the curve L72.

One of the two parametric bias values acquired in this case is 1.00 as indicated by a curve L74, and the other value is 0.79 as indicated by a curve L75.

FIGS. 36 to 39 show error (FIG. 36), target (FIG. 37), output (FIG. 38), and parametric bias (FIG. 39) in the case the RNN 1 is caused to learn a fifth pattern.

Figure 36:
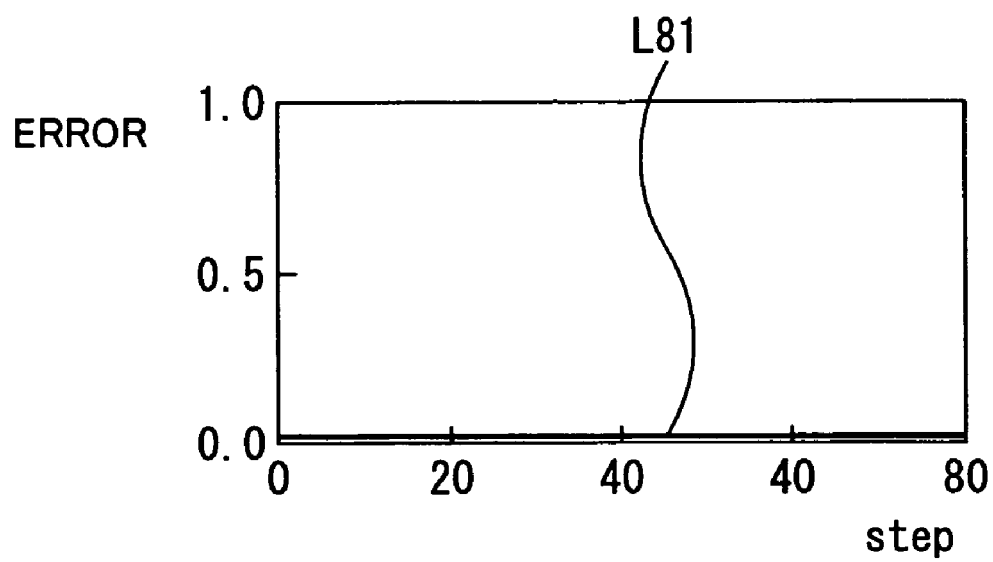
FIG. 36 is a view showing change of error in the case of causing the neural network to learn a fifth pattern.

The error in this learning is substantially 0.0 as indicated by a curve 81 in FIG. 36.

Figure 33:
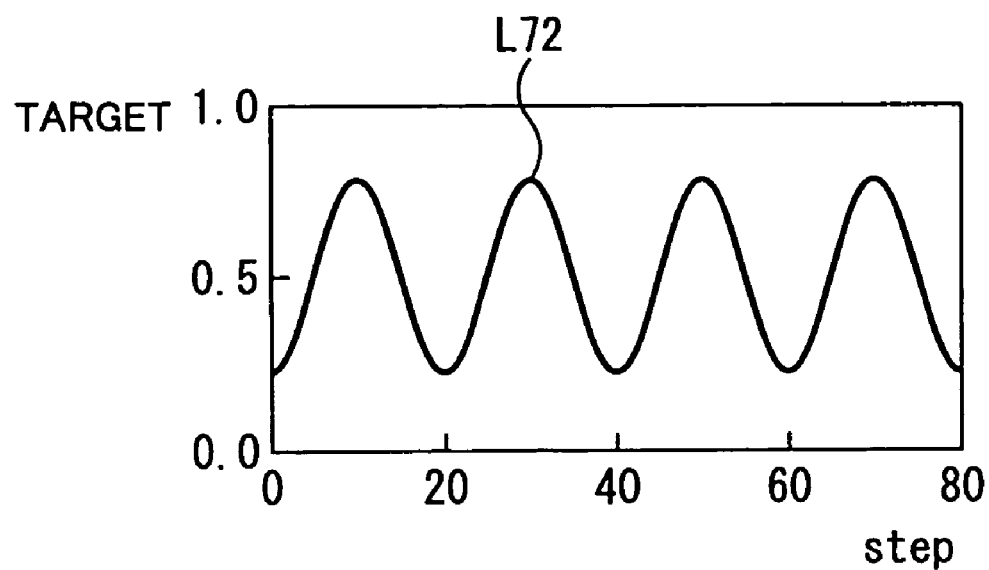
FIG. 33 is a view showing a target in the case of causing the neural network to learn the fourth pattern.
Figure 34:
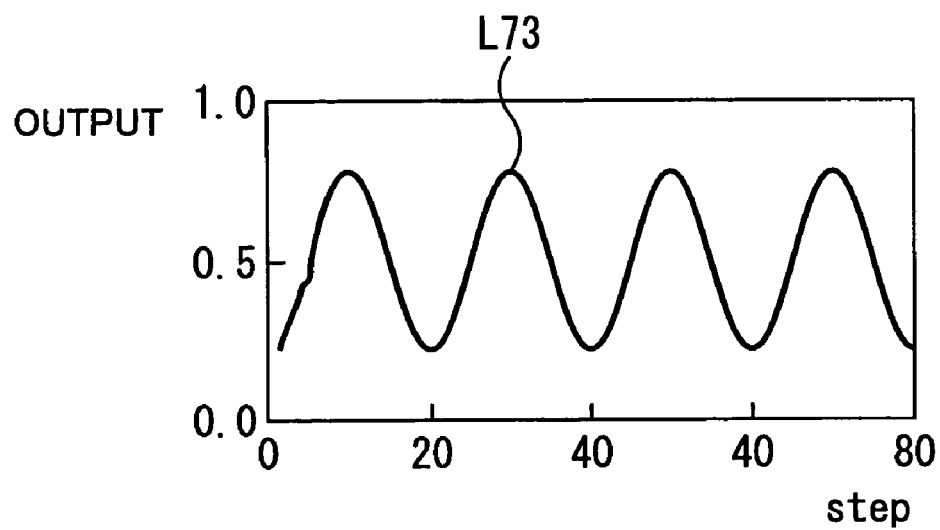
FIG. 34 is a view showing an output in the case of causing the neural network to learn the fourth pattern.
Figure 35:
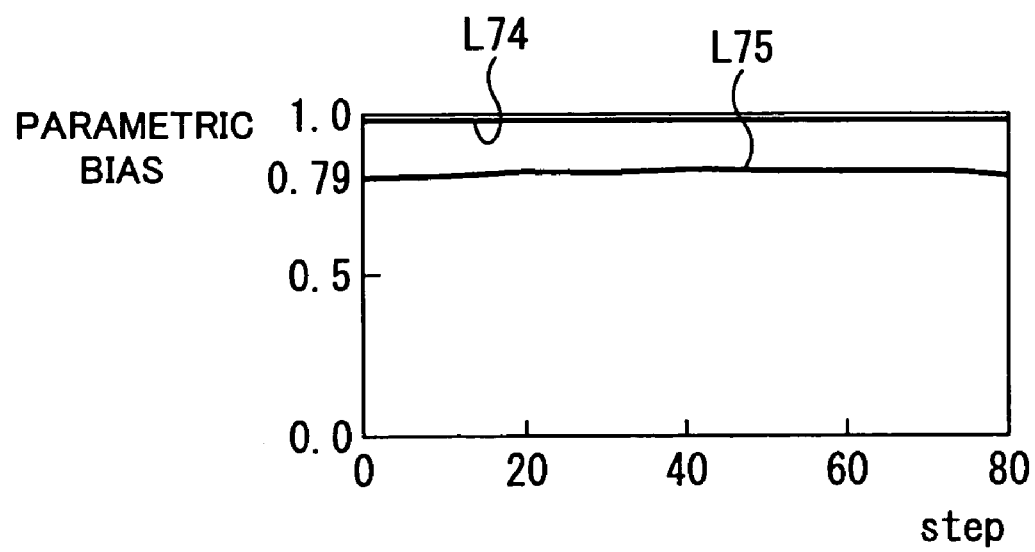
FIG. 35 is a view showing change of parametric bias in the case of causing the neural network to learn the fourth pattern.
Figure 37:
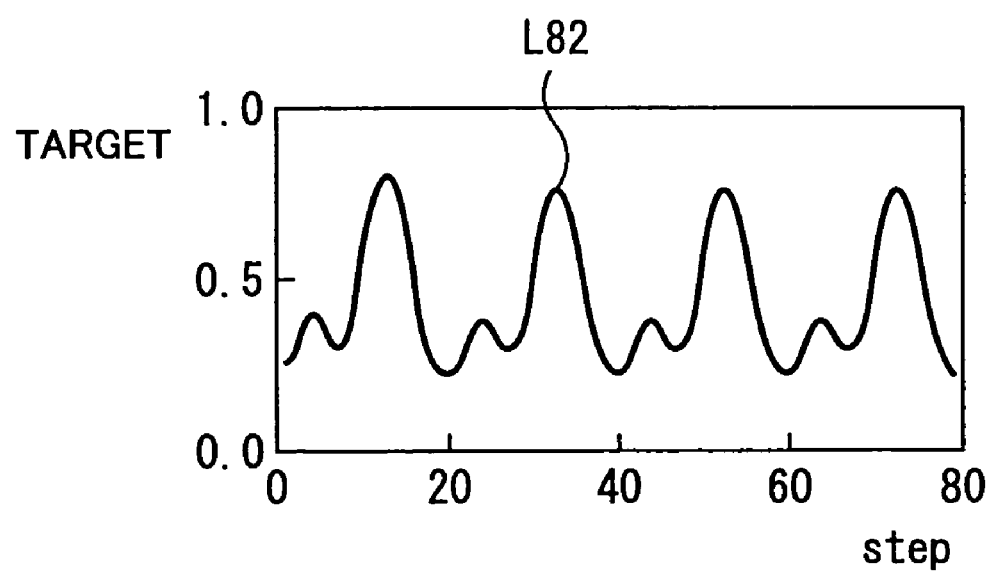
FIG. 37 is a view showing a target in the case of causing the neural network to learn the fifth pattern.

The target is a deformed (strained) sine wave, which is different from the smooth sine wave indicated by the curve L72 in FIG. 33, as indicated by a curve L82 in FIG. 37.

Figure 38:
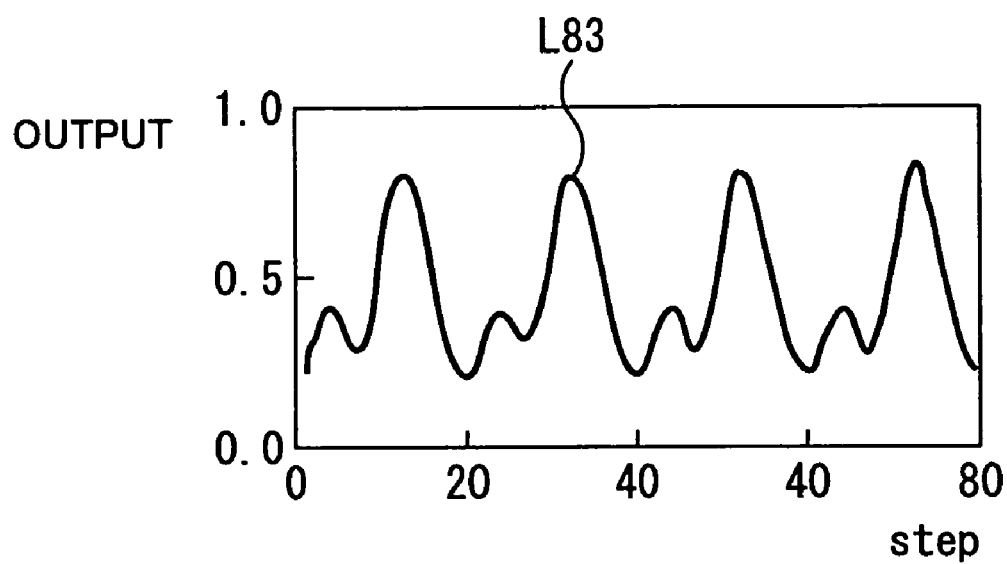
FIG. 38 is a view showing an output in the case of causing the neural network to learn the fifth pattern.
Figure 39:
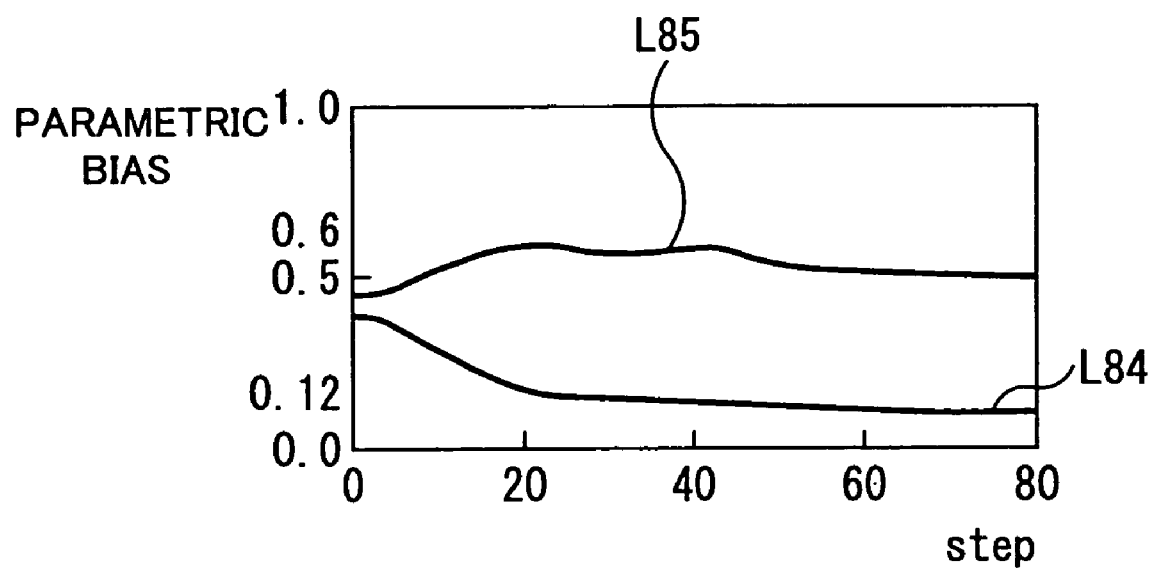
FIG. 39 is a view showing change of parametric bias in the case of causing the neural network to learn the fifth pattern.

As shown in FIG. 38, an output indicated by a curve L83 corresponding to the target shown in FIG. 37 is acquired.

In this learning, one of the parametric bias values converges at 0.12 as indicated by a curve L84, and the other value converges substantially at 0.60 as indicated by a curve L85.

Figure 40:
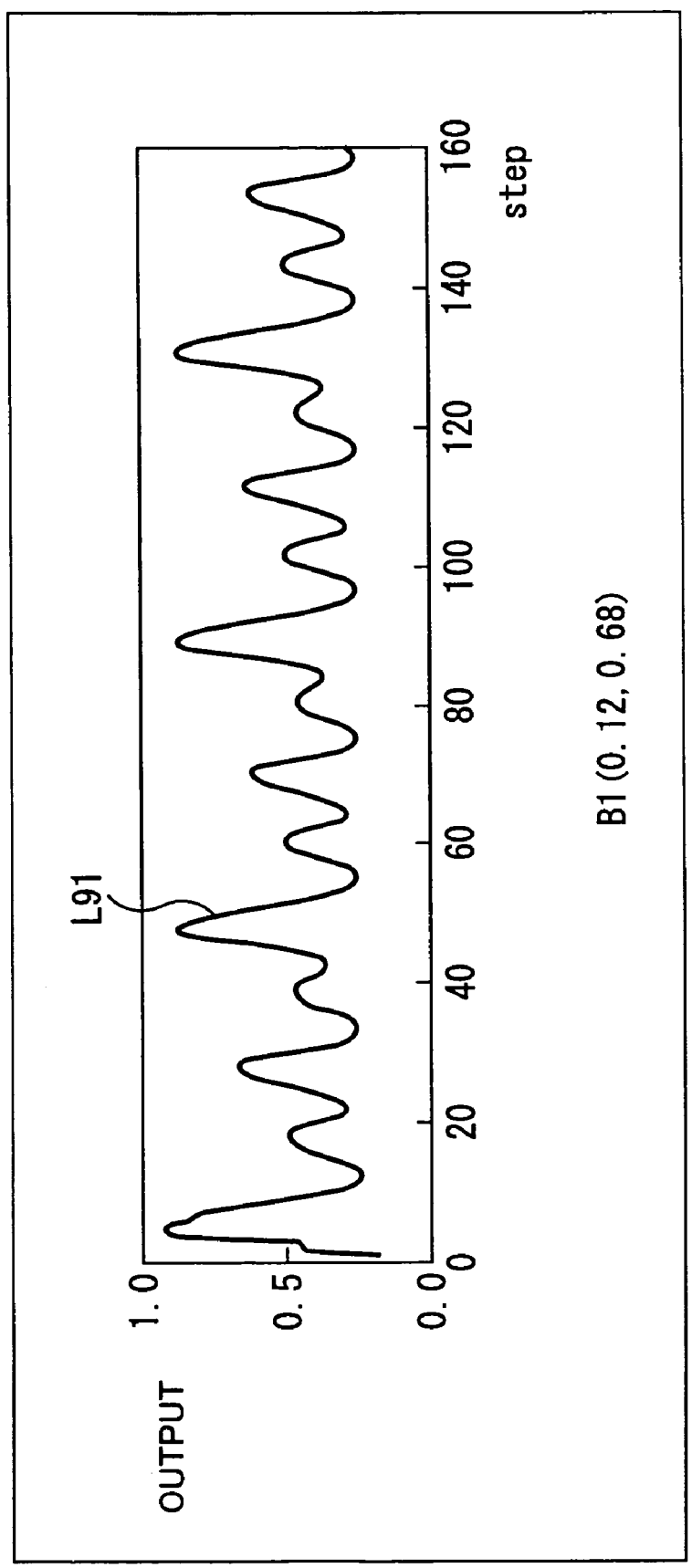
FIG. 40 is a view showing an example of generated pattern.

When parametric bias values (0.12, 0.68) are inputted to the parametric bias nodes 11-2 after the RNN 1 is caused to learn the two time series patterns shown in FIGS. 33 and 37, an output indicated by a curve L91 in FIG. 40 is provided.

Figure 41:
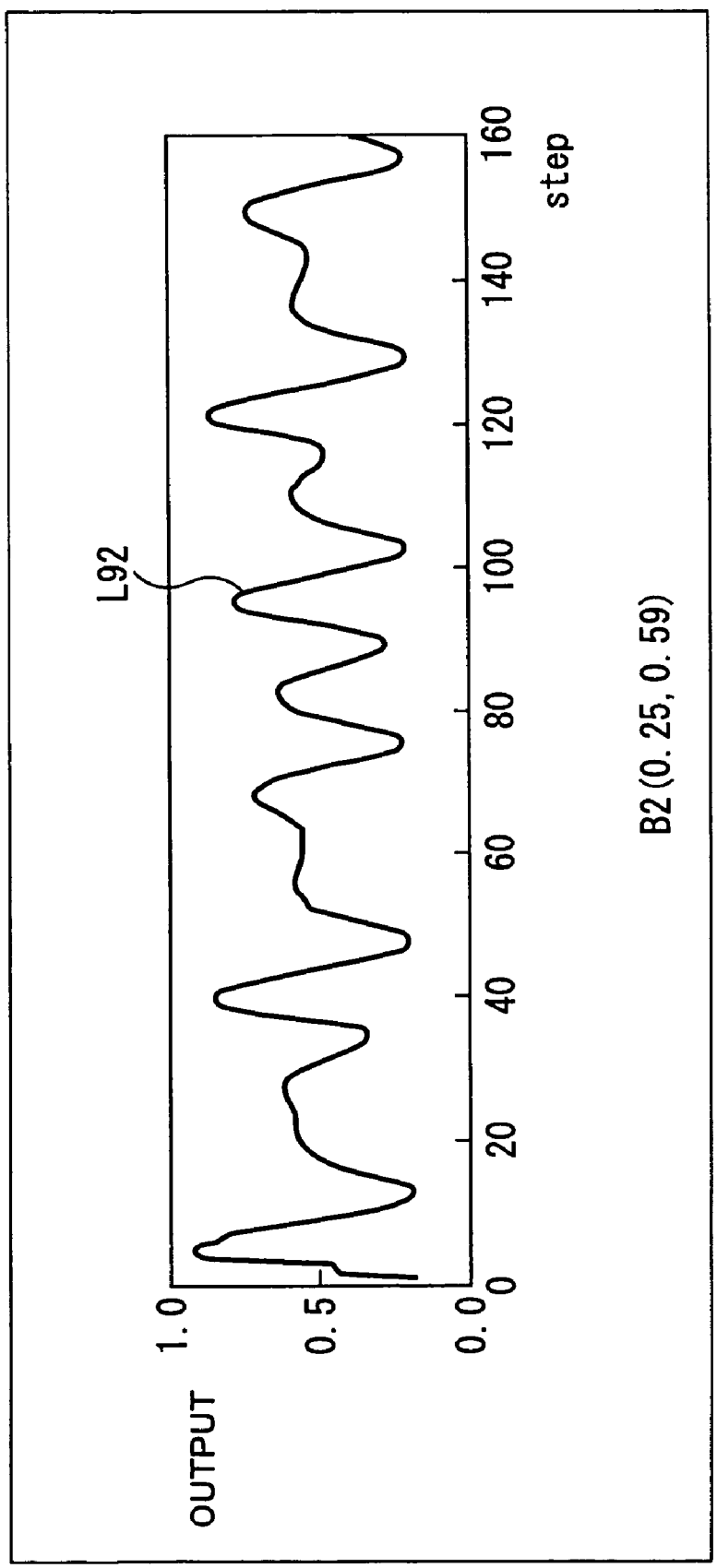
FIG. 41 is a view showing an example of generated pattern.
Figure 42:
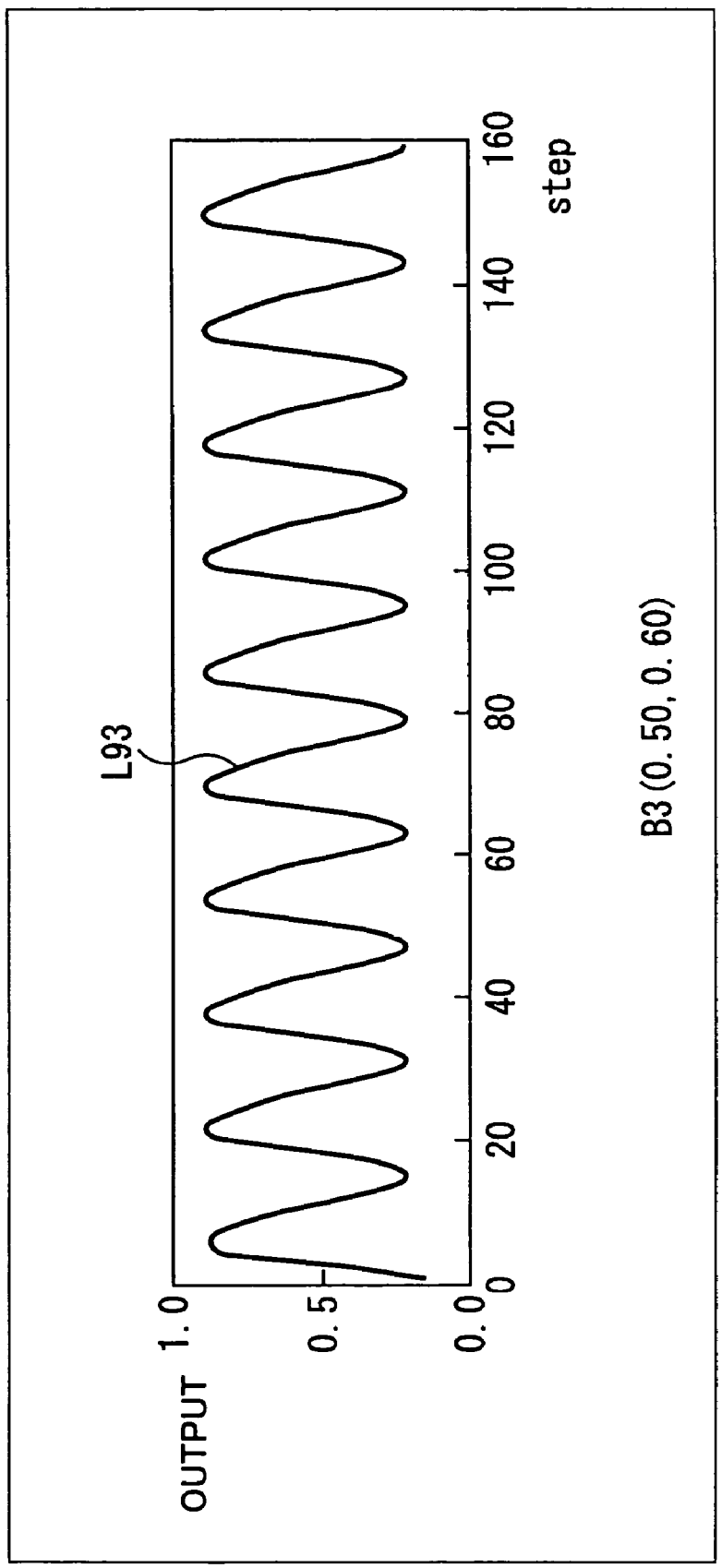
FIG. 42 is a view showing an example of generated pattern.

Similarly, when parametric bias values (0.25, 0.59) are supplied, an output indicated by a curve L92 in FIG. 41 is provided. When parametric bias values (0.50, 0.60) are supplied, an output indicated by a curve L93 in FIG. 42 is provided.

Figure 43:
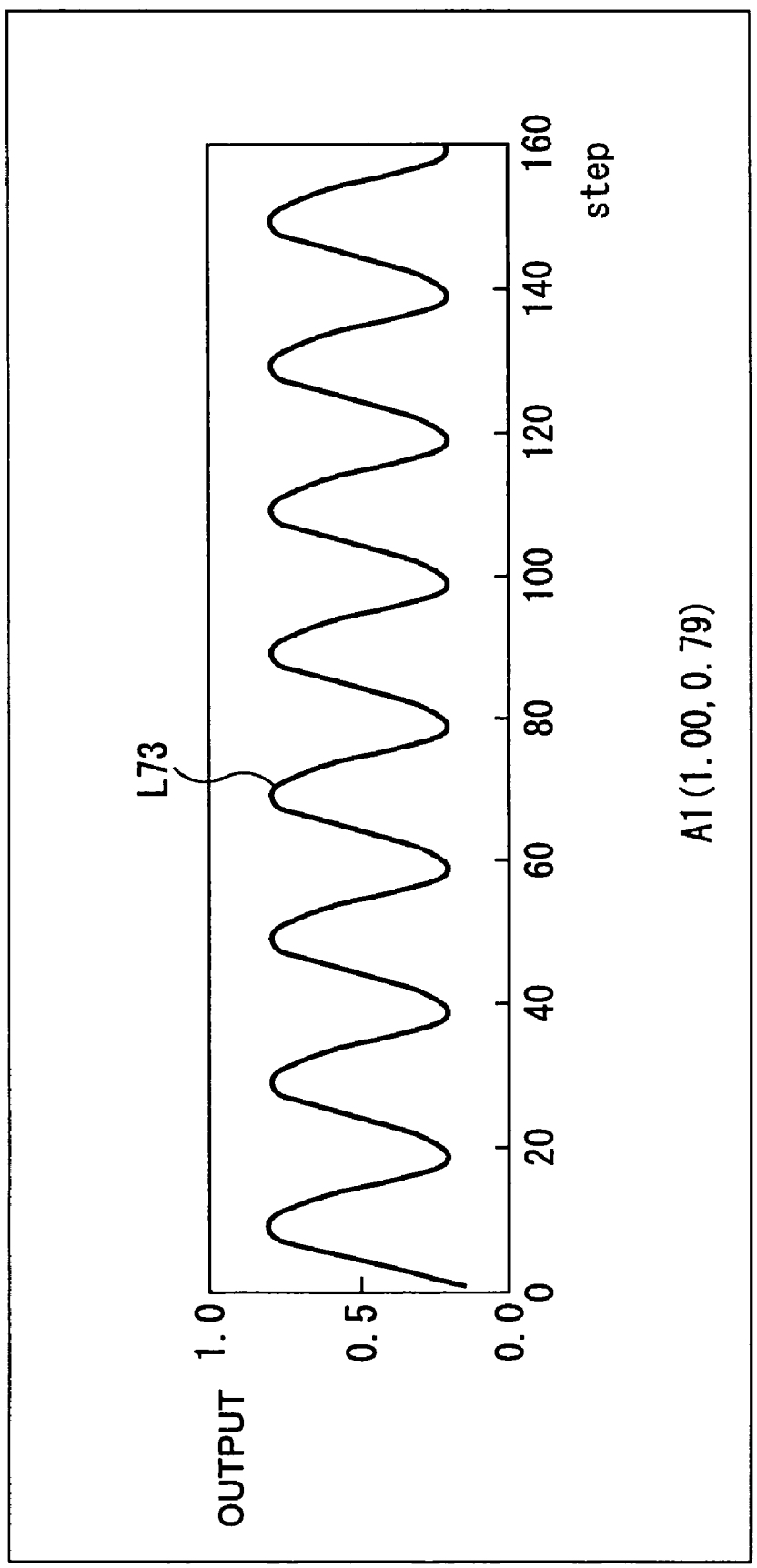
FIG. 43 is a view showing an output corresponding to FIG. 34.
Figure 44:
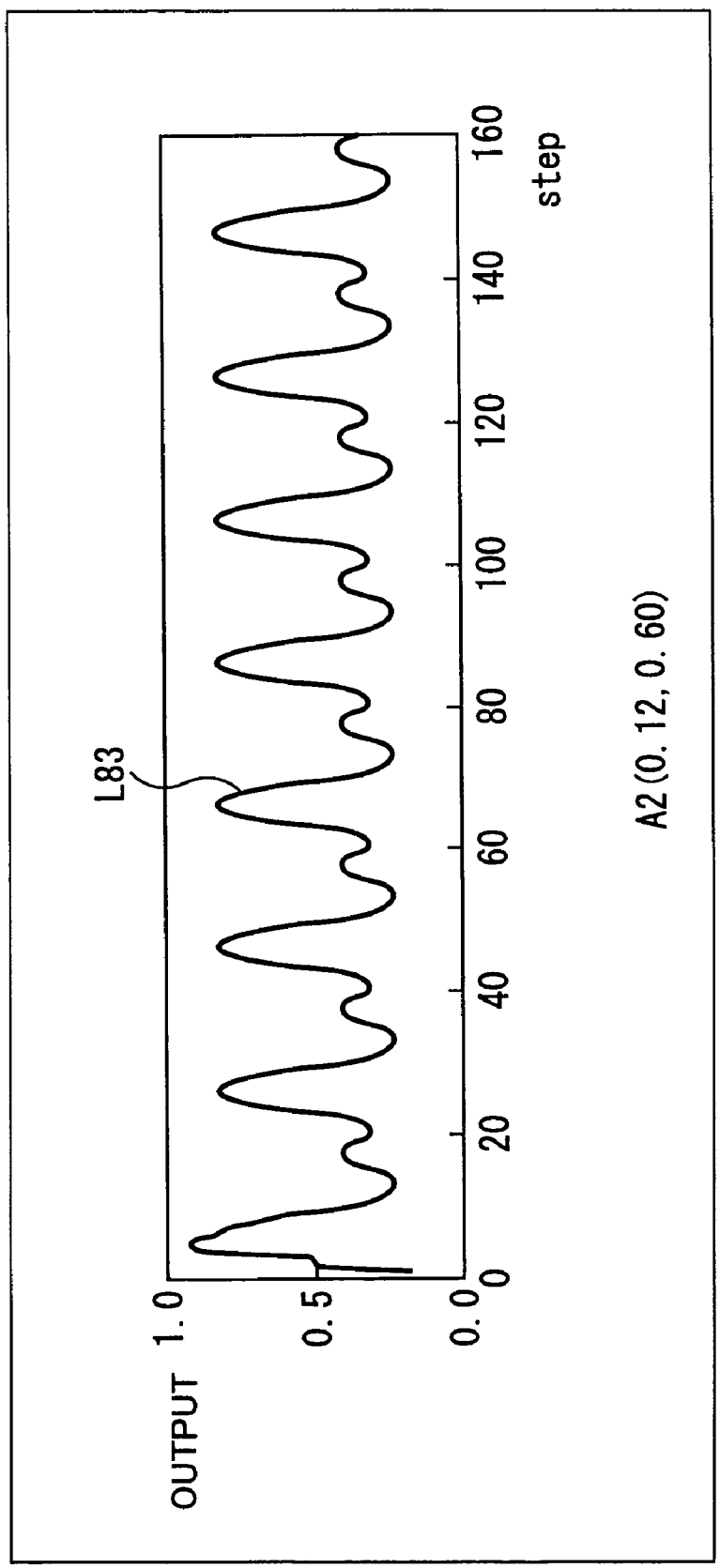
FIG. 44 is a view showing an output corresponding to FIG. 38.

To compare the outputs of FIGS. 40 to 42, FIGS. 43 and 44 show outputs obtained in the case parametric bias values (1.00, 0.79) and parametric bias values (0.12, 0.60) are supplied. That is, the output of FIG. 43 is the same as the output of FIG. 34. The output of FIG. 44 is the same as the output of FIG. 38.

In this manner, in this example, nonlinear arithmetic processing is performed to the parameters.

Figure 45:
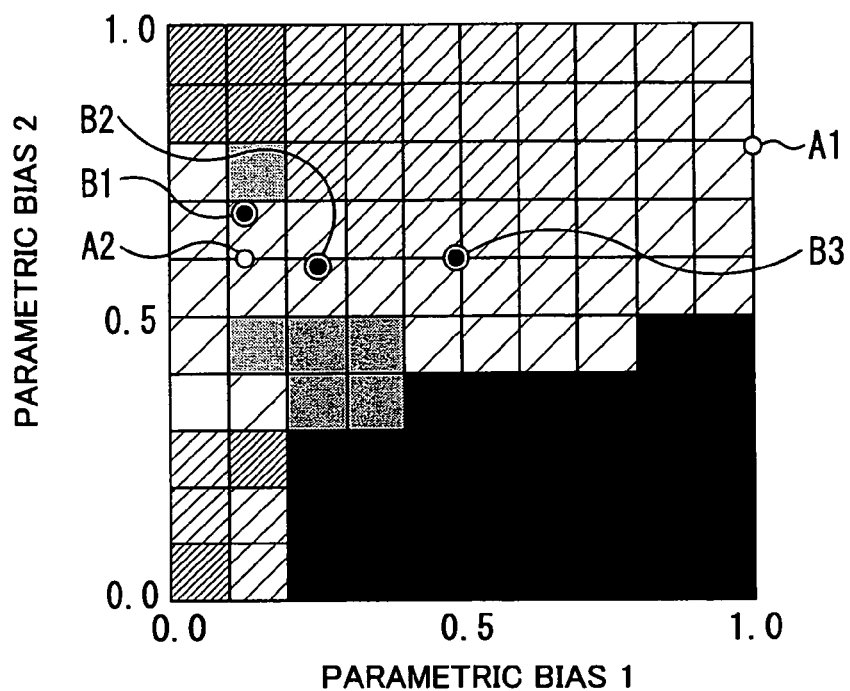
FIG. 45 is a view showing the relation between the cycle of the patterns of FIGS. 40 to 44 and the parametric bias.
Figure 46:
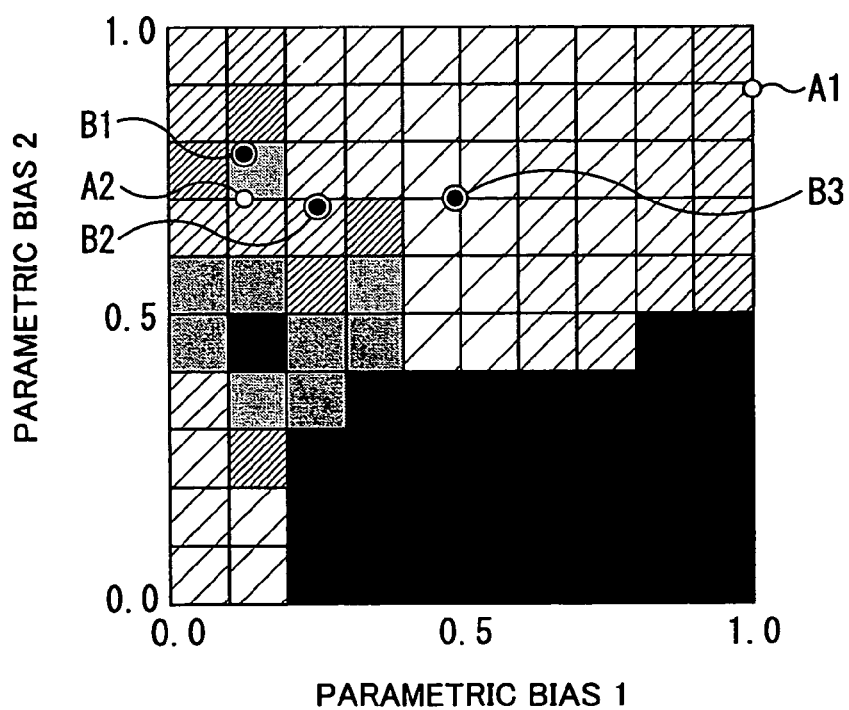
FIG. 46 is a view showing the relation between the amplitude of the patterns of FIGS. 40 to 44 and the parametric bias.

FIG. 45 shows change of the cycle corresponding to the parametric bias. Similarly, FIG. 46 shows change of the amplitude corresponding to the parametric bias. Also in FIGS. 45 and 46, similarly to the cases of FIGS. 27 and 28, the same density means the same cycle or amplitude. In FIGS. 45 and 46, A1, A2, B1, B2 and B3 represent plotted parameter values corresponding to FIG. 43, FIG. 44, FIG. 30, FIG. 41 and FIG. 42.

As is clear from FIGS. 45 and 46, also when nonlinear arithmetic processing is performed, the cycle and amplitude changes substantially smoothly, corresponding to the parameters.

By thus causing the RNN to linear plural time series patterns and then inputting predetermined parameters, it is possible to generate and output a new time series pattern that is different from the learned time series patterns, using linear or nonlinear interpolation.

The parametric bias is a parameter for switching the spatio-temporal pattern generated by the RNN 1. The relation between this parameter and the spatio-temporal pattern is not predetermined but is decided by learning the taught spatio-temporal pattern.

This invention can be applied to, for example, "mimic movement learning" by a humanoid robot. This enables the robot to not only learn plural movement patterns (dancing and so on) taught by a person and reproduce those movements, but also extract common characteristics of the plural taught movement patterns and generate a new movement pattern based on the characteristics.

The above-described series of processing, which can be executed by hardware, can also be executed by software. In this case, for example, a personal computer 160 as shown in FIG. 47 is used.

Figure 47:
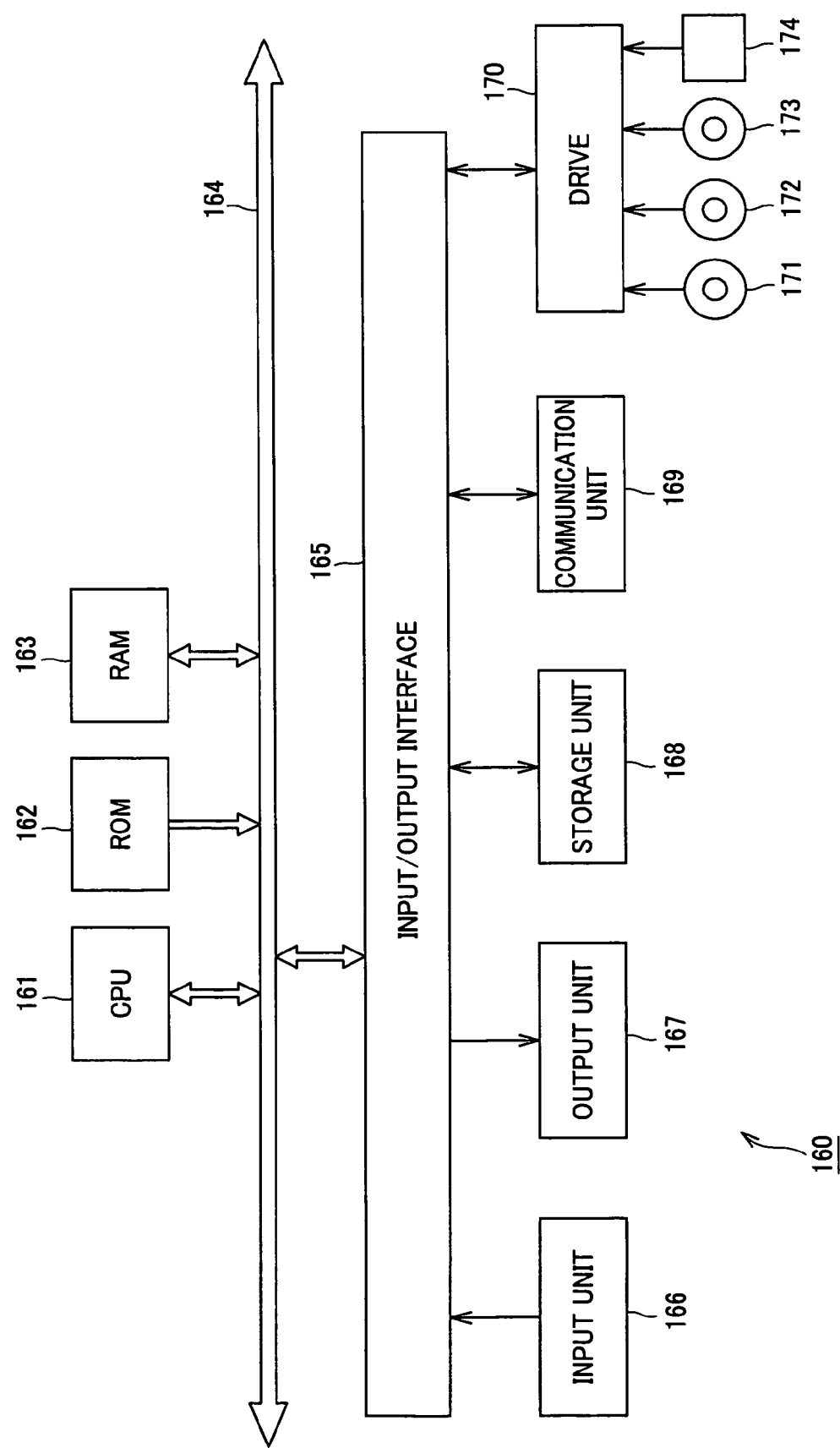
FIG. 47 is a block diagram showing an exemplary structure of a personal computer to which the present invention is applied.

In FIG. 47, a CPU (central processing unit) 161 executes various processing in accordance with programs stored in a ROM (read-only memory) 162 and programs loaded from a storage unit 168 to a RAM (random-access memory) 163. In the RAM 163, necessary data for the CPU 161 to execute various processing are properly stored.

The CPU 161, the ROM 162 and the RAM 163 are interconnected via a bus 164. Also an input/output interface 165 is connected to this bus 164.

The input/output interface 165 is connected with an input unit 166 including a keyboard, a mouse and the like, an output unit 167 including a display such as a CRT or LCD and a speaker, a storage unit 168 including a hard disk, and a communication unit 169 including a modem, a terminal adaptor and the like. The communication unit 169 performs communication processing via a network.

The input/output interface 165 is also connected with a drive 170, when necessary. A magnetic disk 171, an optical disc 172, a magneto-optical disc 173 or a semiconductor memory 174 is properly loaded on the drive 170, and a computer program read from the medium is installed into the storage unit 168, when necessary.

In the case of executing a series of processing by software, a program constituting the software is installed into the personal computer 160 from a network or a recording medium.

This recording medium may be not only a package medium such as the magnetic disk 171 (including a floppy disk), the optical disc 172 (including CD-ROM (compact disc read-only memory) and DVD (digital versatile disk)), the magneto-optical disc 173 (including MD (mini-disc)) or the semiconductor memory 174 which is distributed to provide the program to the user separately from the device and in which the program is recorded, but also the ROM 162 or the hard disk included in the storage unit 168 which is provided to the user in the form of being incorporated in the device and in which the program is recorded, as shown in FIG. 47.

In this specification, the step of describing a program to be recorded to a recording medium includes the processing performed in time series in the described order and also includes processing executed in parallel or individually, though not necessarily in time series.

Moreover, in this specification, the system means the whole device including plural units and devices.

While the invention has been described in accordance with certain preferred embodiments thereof illustrated in the accompanying drawings and described in the above description in detail, it should be understood by those ordinarily skilled in the art that the invention is not limited to the embodiments, but various modifications, alternative constructions or equivalents can be implemented without departing from the scope and spirit of the present invention as set forth and defined by the appended claims.

INDUSTRIAL APPLICABILITY

As is described above, according to the present invention, a time series pattern can be generated. Moreover, the generated time series pattern can be a new time series pattern.

The invention claimed is:

1. An information processing device for outputting a time series pattern comprising:
   input means for inputting a time series pattern;
   model decision means for deciding a model based on a common nonlinear dynamic system having one or more feature parameters that can be operated from outside with respect to each of plural time series patterns inputted by the input means;
   arithmetic means for calculating a value of the feature parameter on the basis of the decided model;
   setting means for setting a value that is different from the value calculated by the arithmetic means, as the feature parameter, and performing inverse operation of the calculation of the value of the feature parameter; and output means for outputting a new time series pattern as a function of the inverse operation of the model decision means such that a recurrent neural network utilizes the new time series pattern for predictive learning.

2. The information processing device as claimed in claim 1, wherein the nonlinear dynamic system is a recurrent neural network with an operating parameter.

3. The information processing device as claimed in claim 1, wherein the feature parameter indicates a dynamic structure of the time series pattern in the nonlinear dynamic system.

4. The information processing device as claimed in claim 3, wherein the output means outputs a new time series pattern having a dynamic structure that is shareable with plural inputted time series patterns.

5. An information processing method of an information processing device for outputting a time series pattern the method comprising:

inputting a time series pattern;

deciding a model based on a common nonlinear dynamic system having one or more feature parameters that can be operated from outside with respect to each of plural time series patterns inputted by the input step;

calculating a value of the feature parameter on the basis of the decided model;

setting a value that is different from the value calculated by the processing of the arithmetic step, as the feature parameter, and performing inverse operation of the calculation of the value of the feature parameter; and outputting a new time series pattern as a function of the inverse operation of the model deciding step such that a recurrent neural network utilizes the new time series pattern for predictive learning.

6. A program storage medium having a computer-readable program stored therein, the program being executed by an information processing device for outputting a time series pattern, the program comprising:

an input step of inputting a time series pattern;

a model decision step of deciding a model based on a common nonlinear dynamic system having one or more feature parameters that can be operated from outside with respect to each of plural time series patterns inputted by the processing of the input step;

an arithmetic step of calculating a value of the feature parameter on the basis of the decided model;

a setting step of setting a value that is different from the value calculated by the processing of the arithmetic step, as the feature parameter, and performing inverse operation of the calculation of the value of the feature parameter; and an output step of outputting a new time series pattern as a function of the inverse operation of the model deciding step such that a recurrent neural network utilizes the new time series pattern for predictive learning.

7. A computer program for controlling an information processing device that outputs a time series pattern, the program comprising:

an input step of inputting a time series pattern;

a model decision step of deciding a model based on a common nonlinear dynamic system having one or more feature parameters that can be operated from outside with respect to each of plural time series patterns inputted by the processing of the input step;

an arithmetic step of calculating a value of the feature parameter on the basis of the decided model;

a setting step of setting a value that is different from the value calculated by the processing of the arithmetic step, as the feature parameter, and performing inverse operation of the calculation of the value of the feature parameter; and an output step of outputting a new time series pattern as a function of the inverse operation of the model decision step such that a recurrent neural network utilizes the new time series pattern for predictive learning.

* * * * *